United States Patent [19]
Alliston et al.

[11] 3,889,106
[45] June 10, 1975

[54] METHOD AND SYSTEM FOR NUCLEAR POWER PLANT SYNCHROSCOPE SIMULATION FOR OPERATOR TRAINING

[75] Inventors: William H. Alliston, Murrysville; Steven J. Johnson, McKnight Rd., both of Pa.

[73] Assignee: Westinghouse Electric Corporation, Pittsburgh, Pa.

[22] Filed: Mar. 14, 1973

[21] Appl. No.: 341,181

[52] U.S. Cl. ............... 235/151.21; 35/13; 444/1; 176/19
[51] Int. Cl. ..... G06f 15/06; G06f 15/56; G06b 9/00
[58] Field of Search ........... 444/1; 235/184, 151.21; 176/19, 24; 35/10, 13, 2

[56] References Cited
UNITED STATES PATENTS
3,061,945   1/1962   Hawkins .............................. 35/10
3,237,318   3/1966   Schager .............................. 35/10

OTHER PUBLICATIONS

Reactor Simulator Tuilizing A Vacuum; Harry Reese Jr.; RCA Technical Notes, RCA TN No.: 493, Sept. 1961.
Dynamic Simulation of a Fast Reactor; R. G. Olson, Nucleonics, May, 1957; pp. 76-79.
An Electronic Reactor Simulator; Ross Cameron & D. A. Austio; Nuclear Power; April, 1957; pp. 146-151.
PWR Training Simulator; J. P. Franz & W. H. Alliston; Nucleonics, May, 1957; pp. 80-83.

Primary Examiner—Malcolm A. Morrison
Assistant Examiner—Edward J. Wise
Attorney, Agent, or Firm—H. W. Patterson

[57] ABSTRACT

A method and system for the real-time simulation of the dynamic operation of a nuclear power plant in which a synchroscope is provided for determining the frequency and phase difference of two voltage sources for informing the operator of the proper conditions for connecting the two voltage sources to a common electrical distribution line, utilizes apparatus that includes digital computer means for calculating data relating to the frequency difference between combinations of two voltage sources in accordance with predetermined simulated conditions including the operation of control panel devices. A digital to analogue converter utilizes the selected frequency difference and a bias factor to operate a voltage controlled generator for producing an AC voltage which operates a synchroscope dial in accordance with its frequency and the frequency of a constant reference voltage.

14 Claims, 34 Drawing Figures

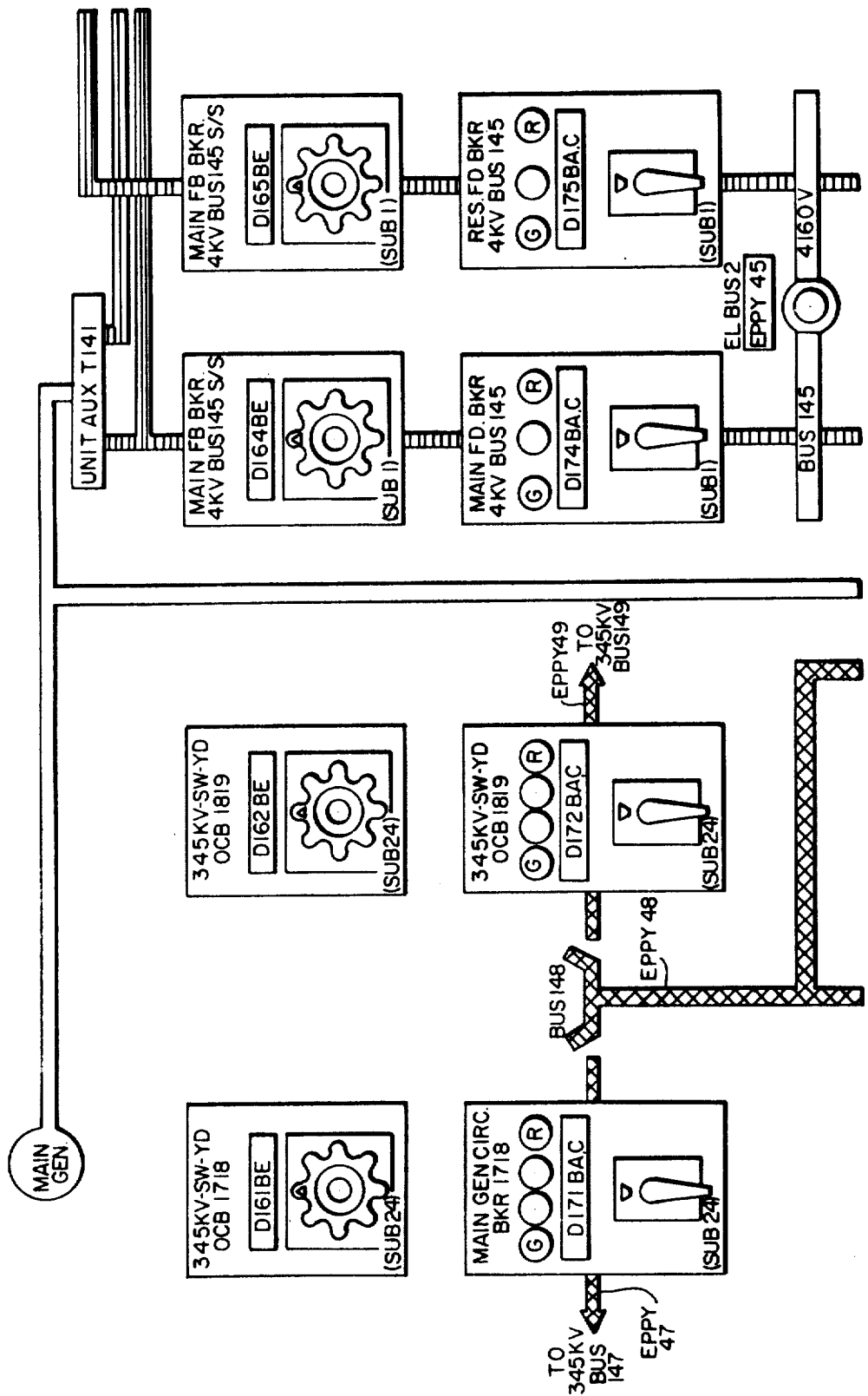

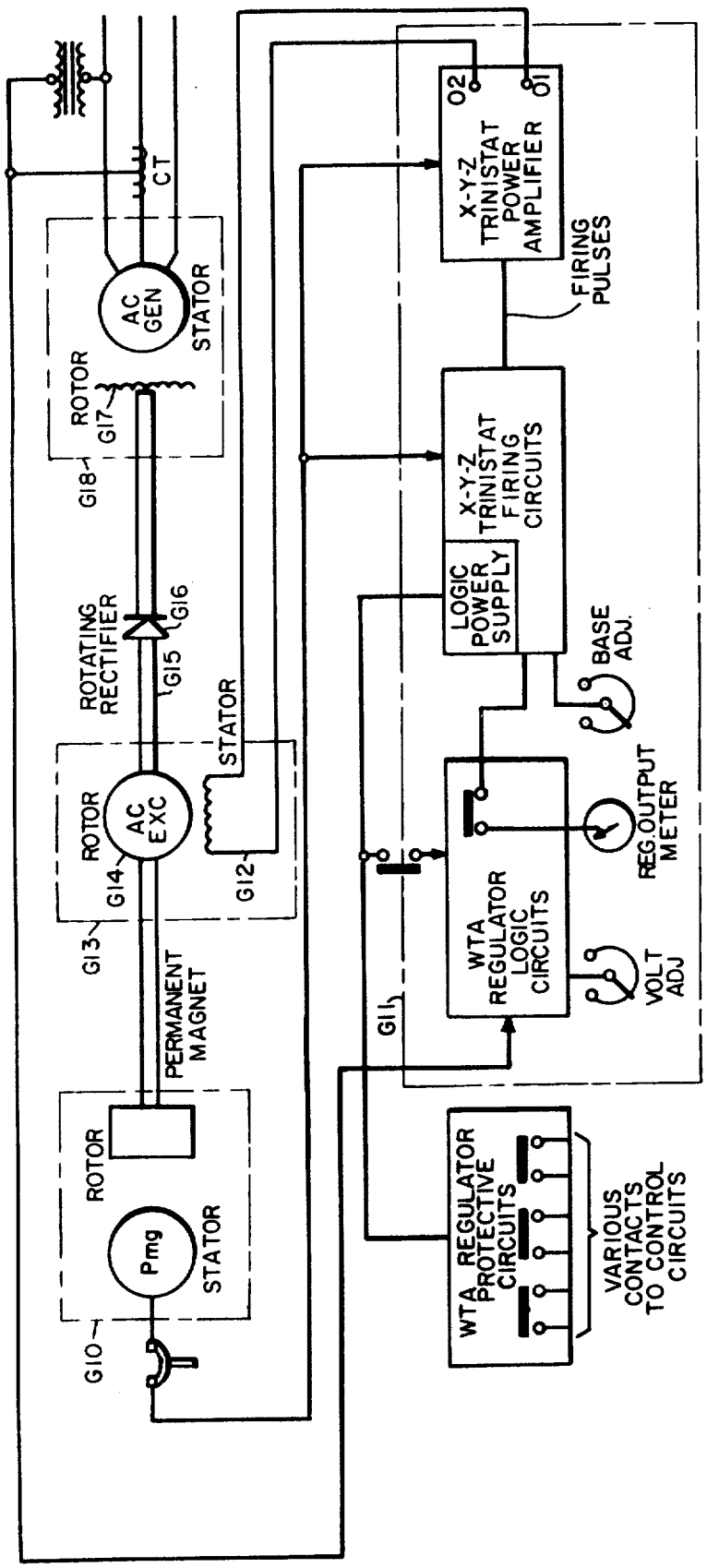
FIG. 112
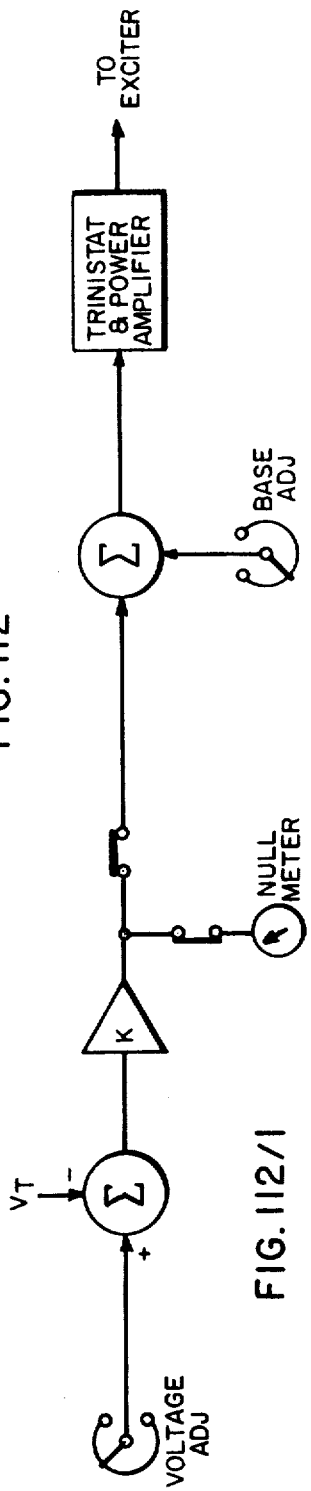
FIG. 112/1

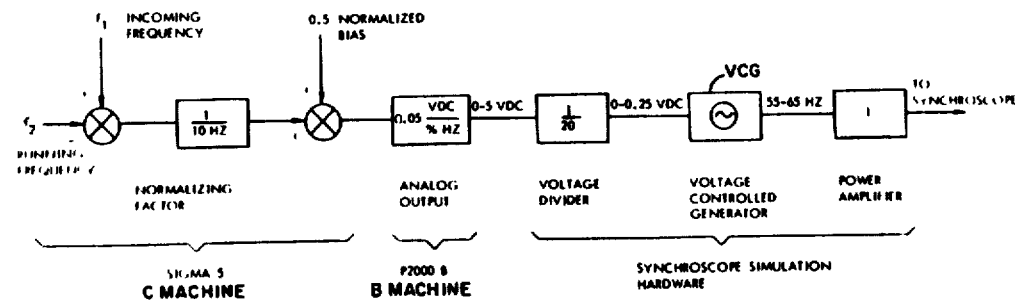
FIG. 113
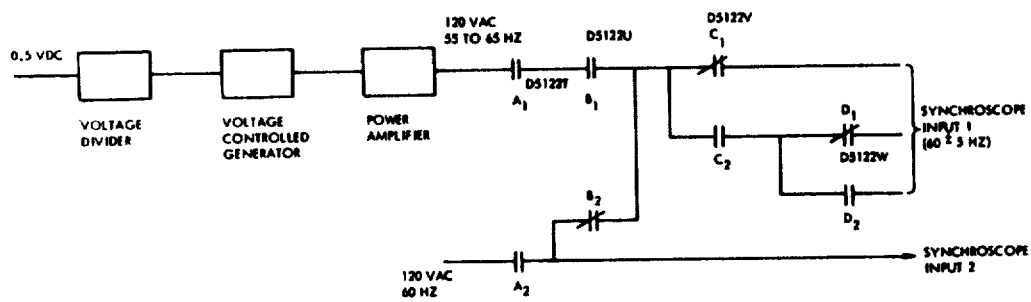
FIG. 113/1

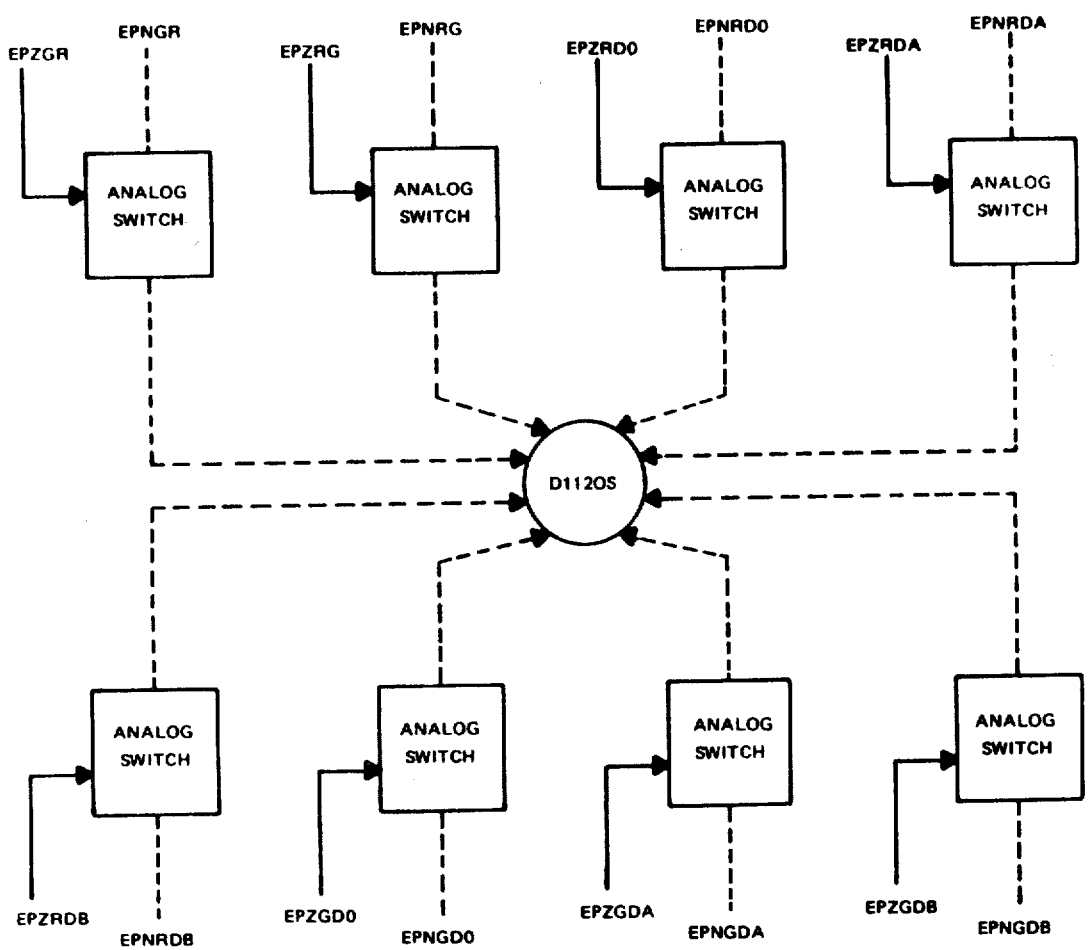
FIG. 113/2

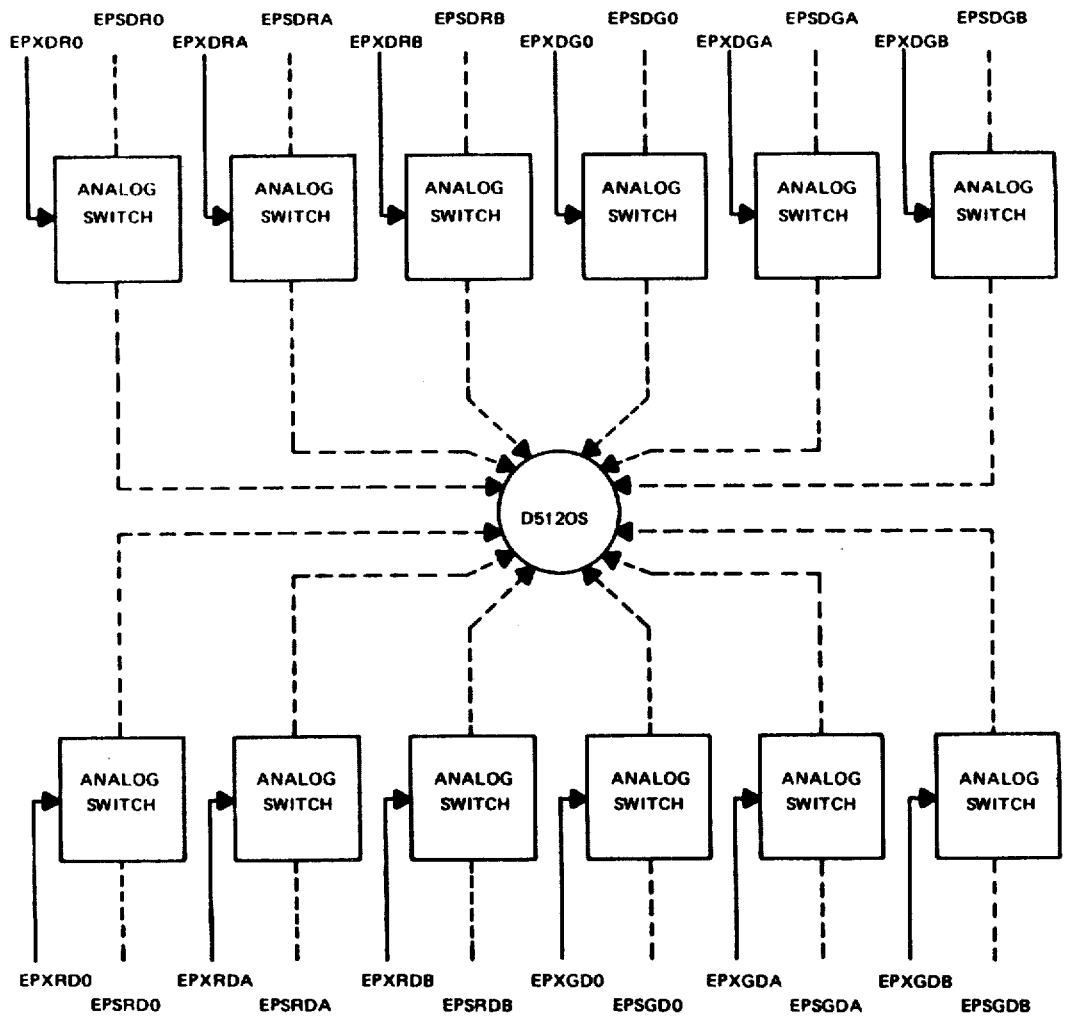
FIG. 113/3

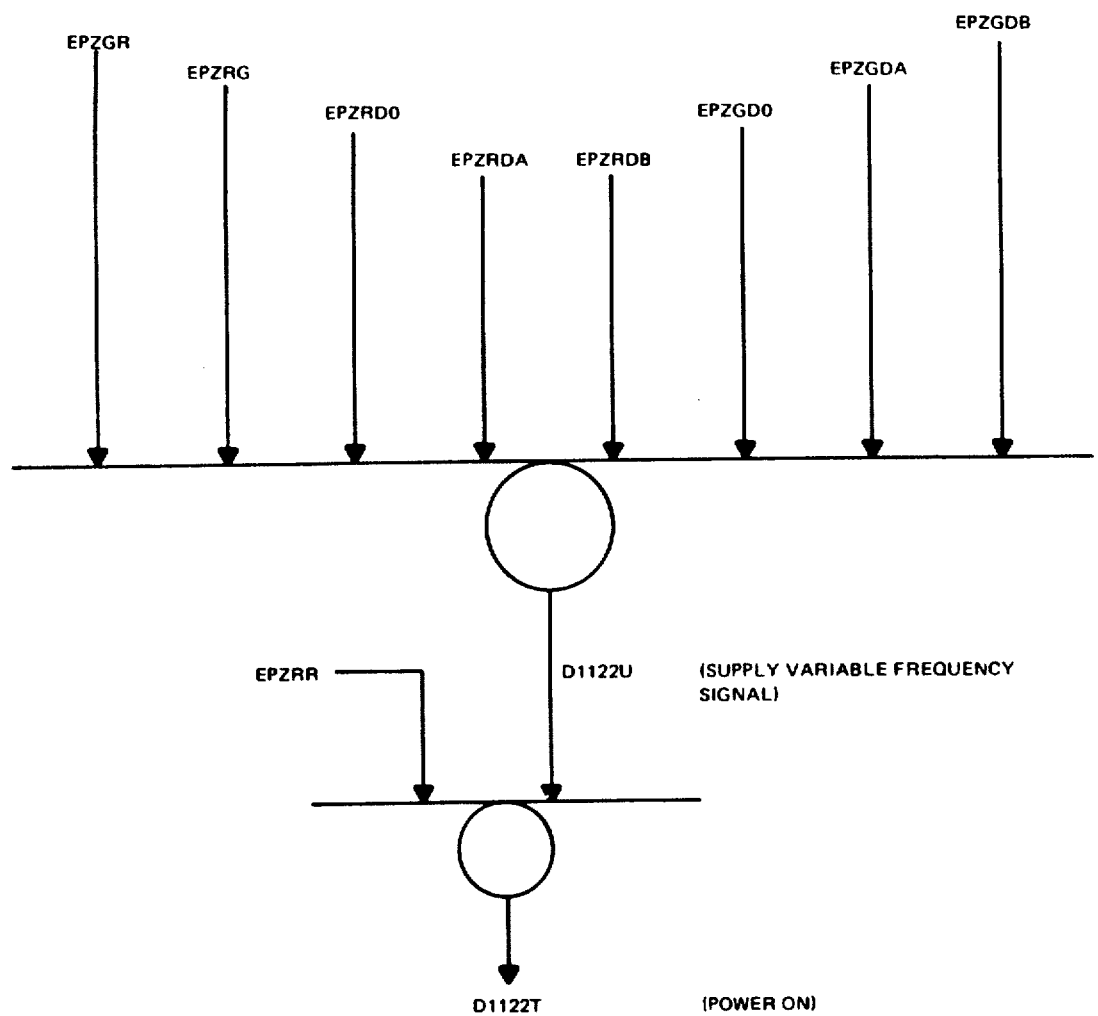
FIG. 113/4

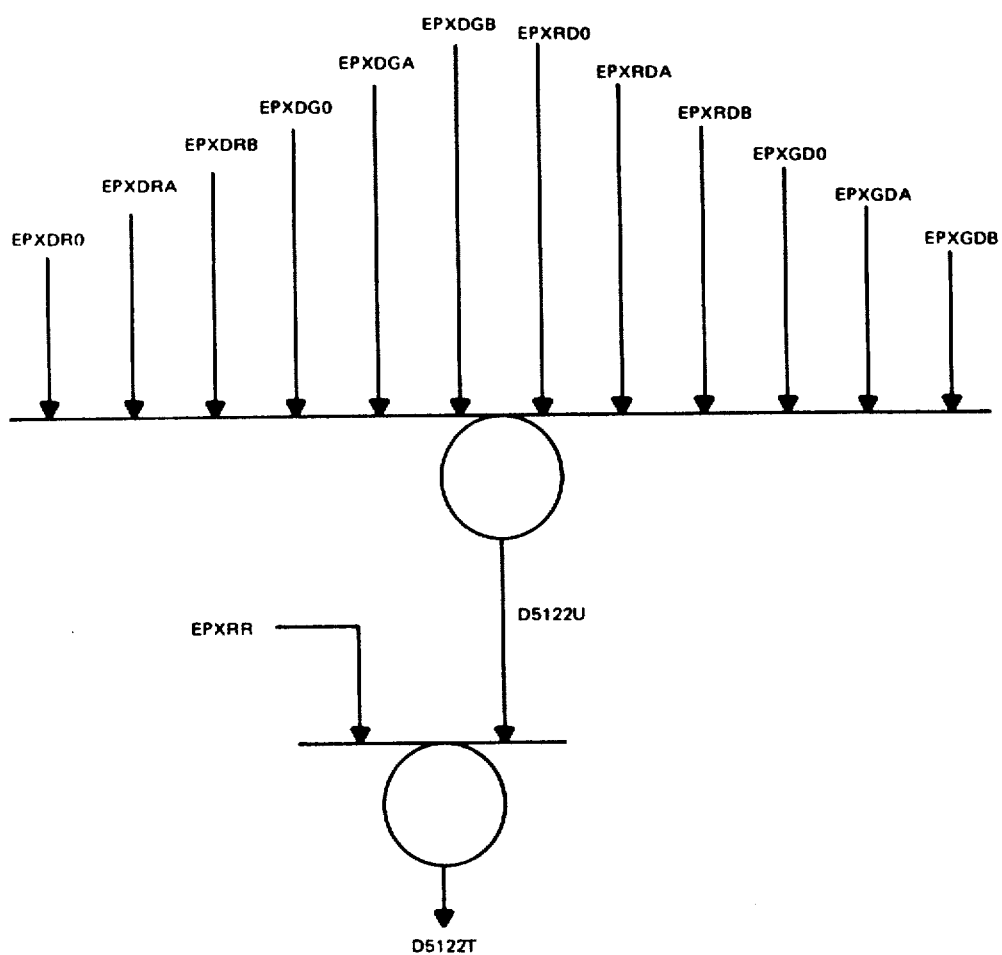
FIG. 113/5

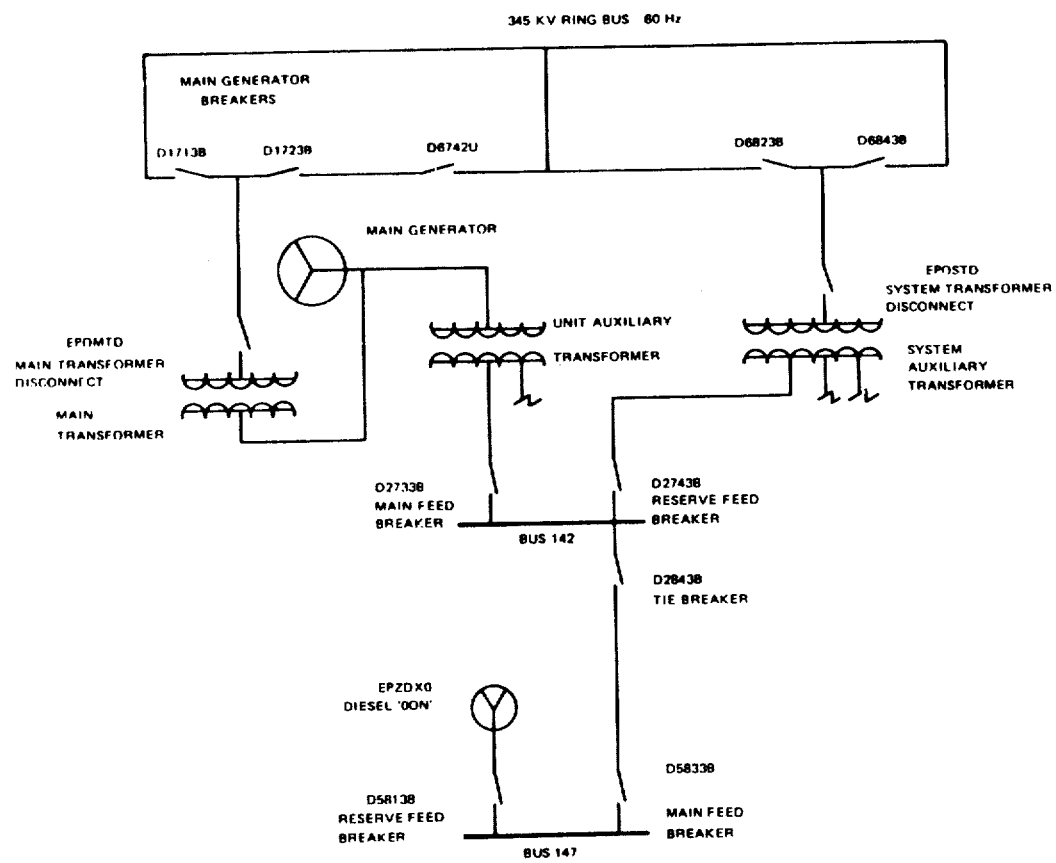
FIG. 113/6

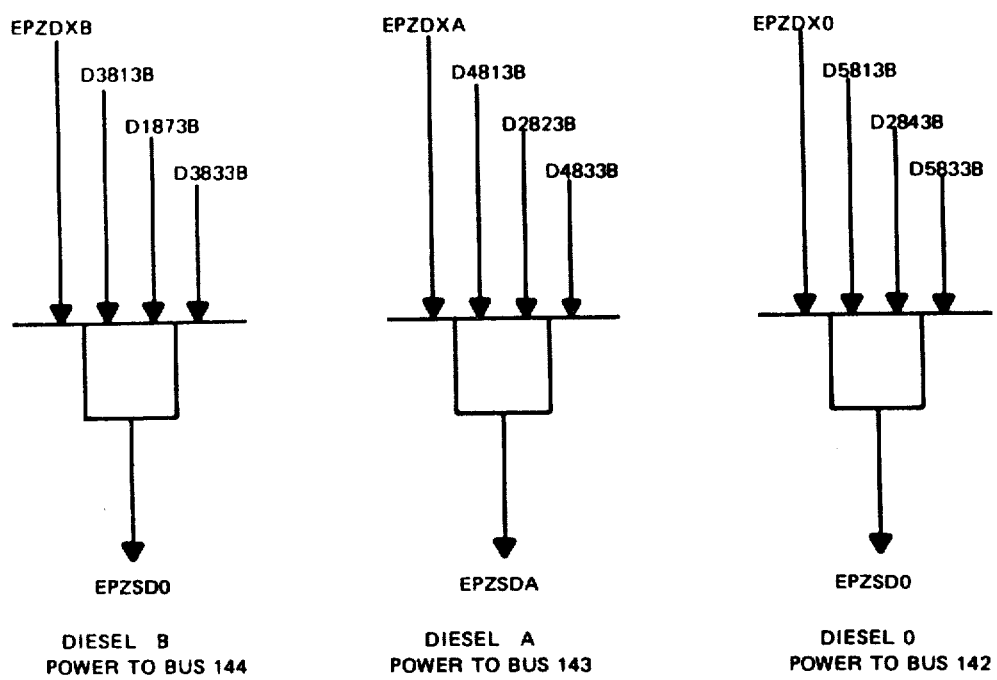
FIG. 113/7

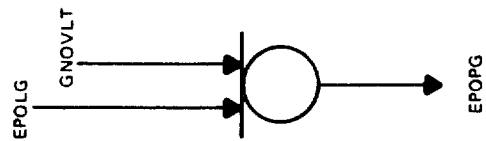
FIG. 113/10
POWER AVAILABLE AT GENERATOR OUTPUT TERMINALS – NOT NECESSARILY AT 60 Hz
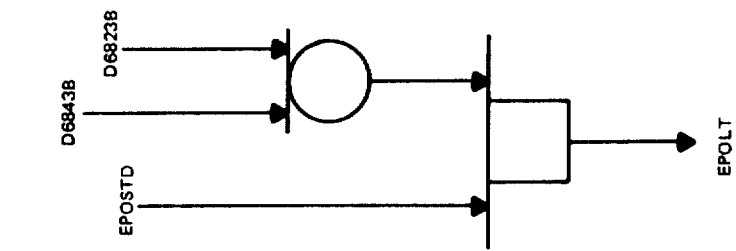
FIG. 113/9
SYSTEM TRANSFORMER LINKED TO 345 SYSTEM
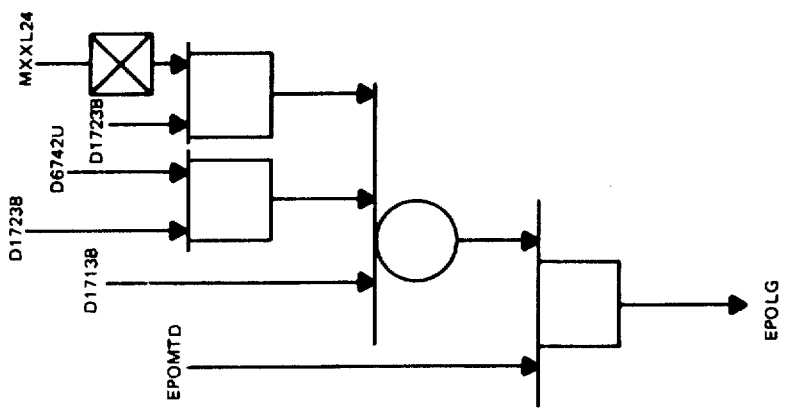
FIG. 113/8
GENERATOR LINKED TO 345 SYSTEM

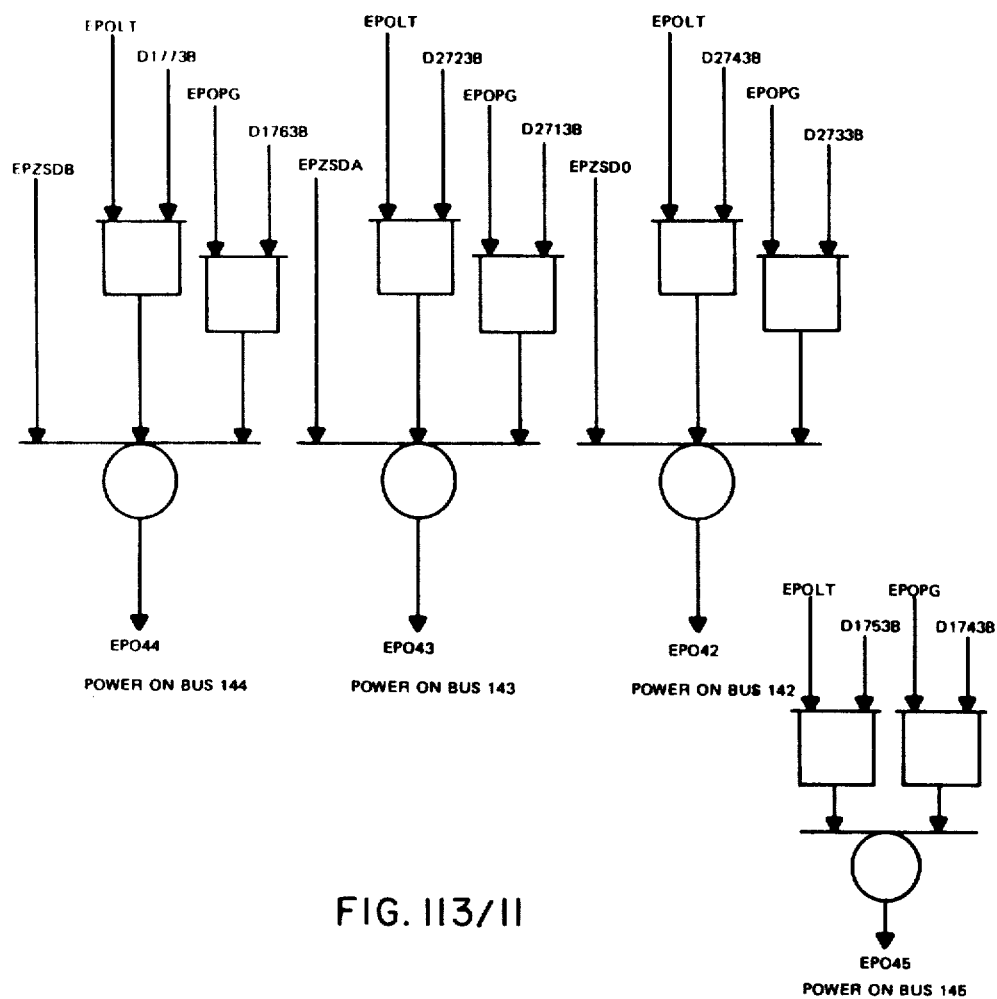
FIG. 113/11

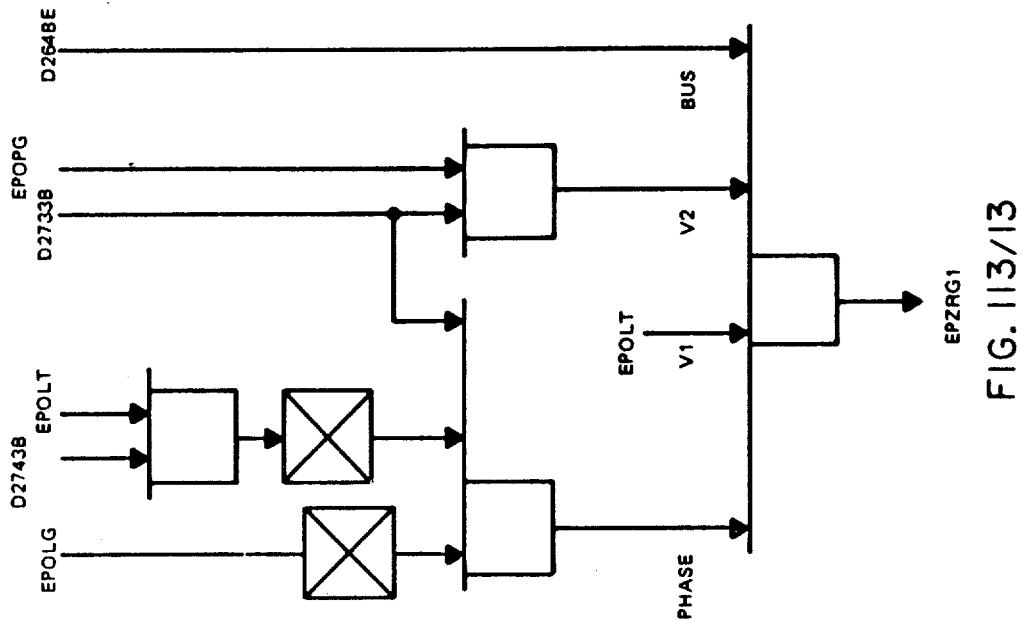
FIG. 113/13
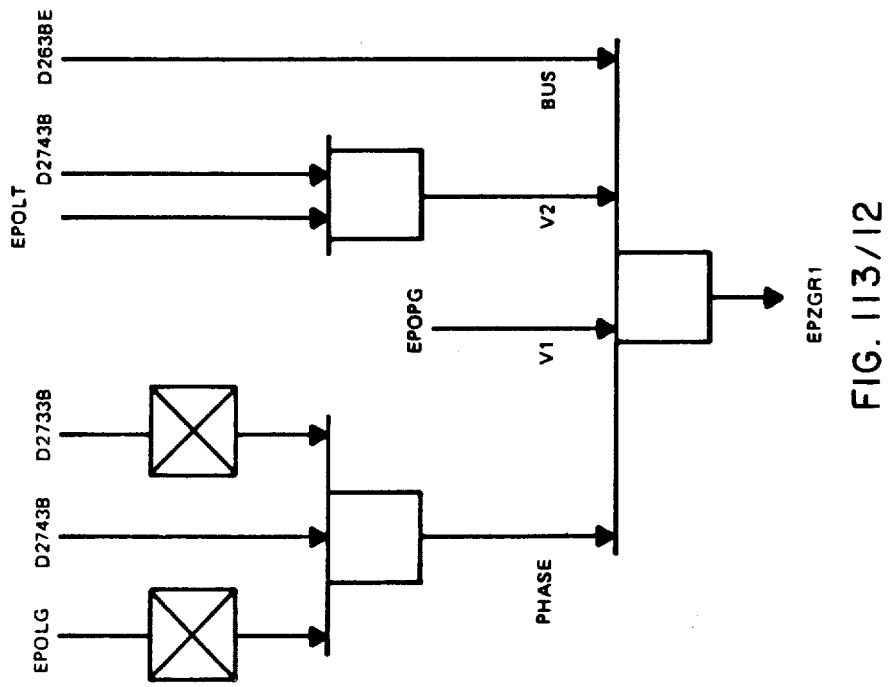
FIG. 113/12

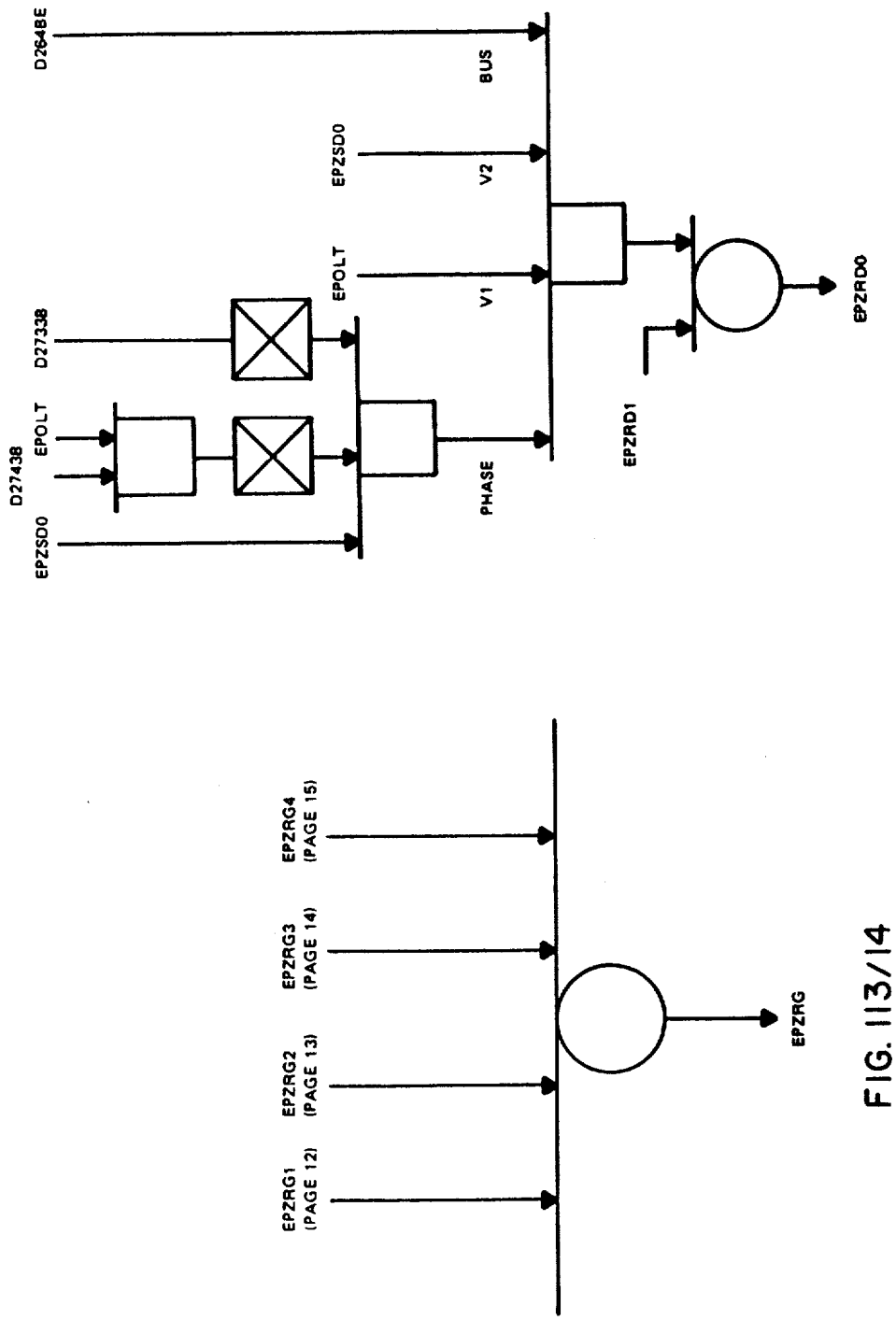

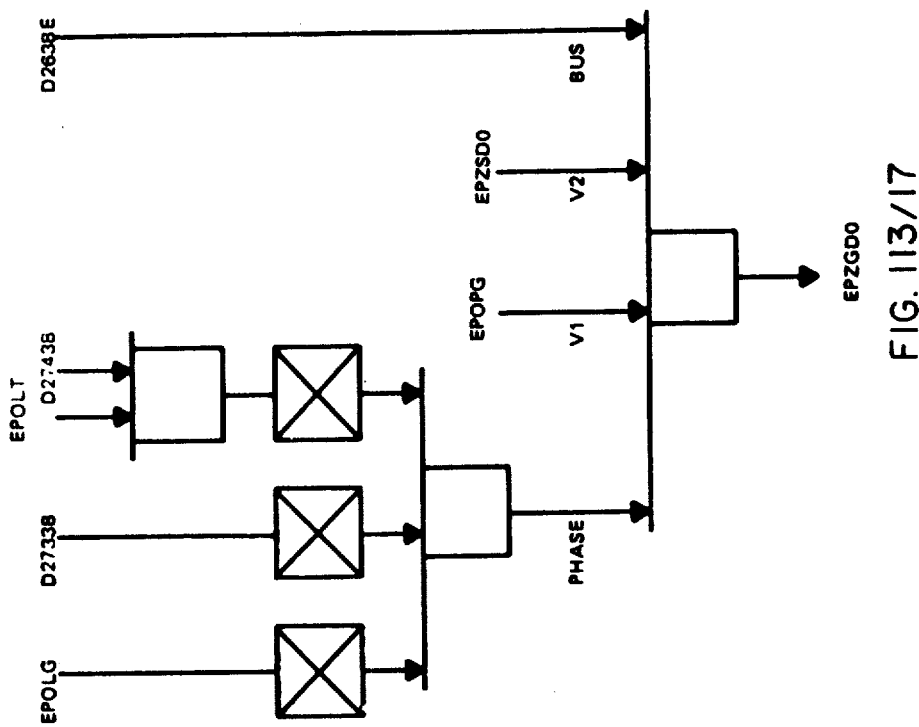
FIG. 113/17
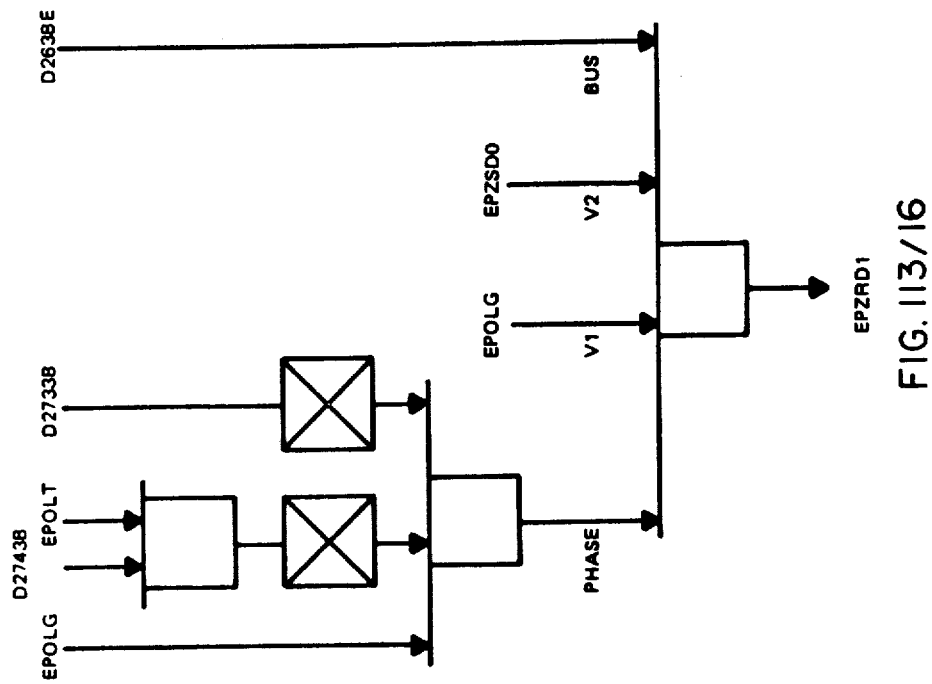
FIG. 113/16

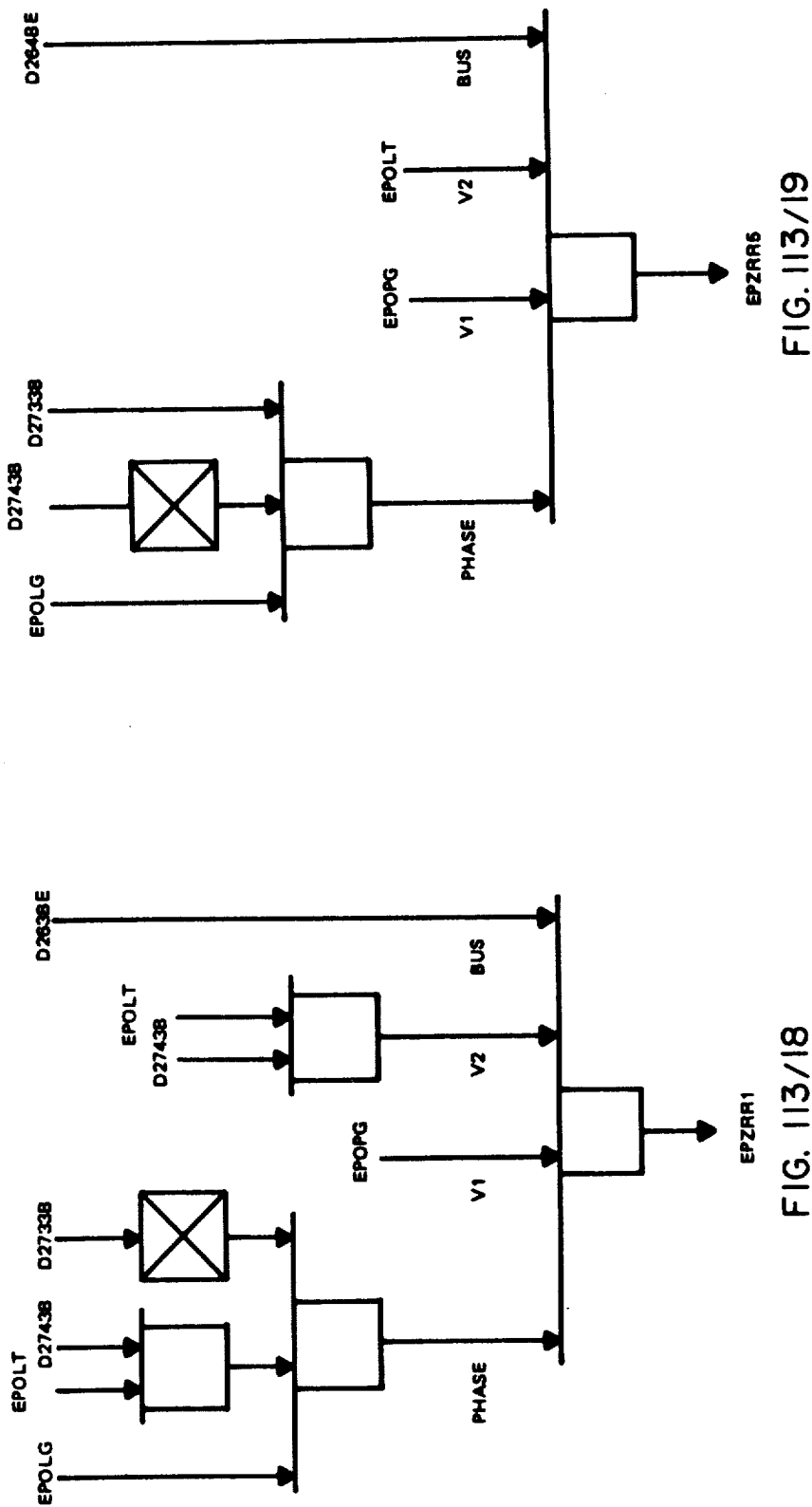
FIG. 113/19
FIG. 113/18

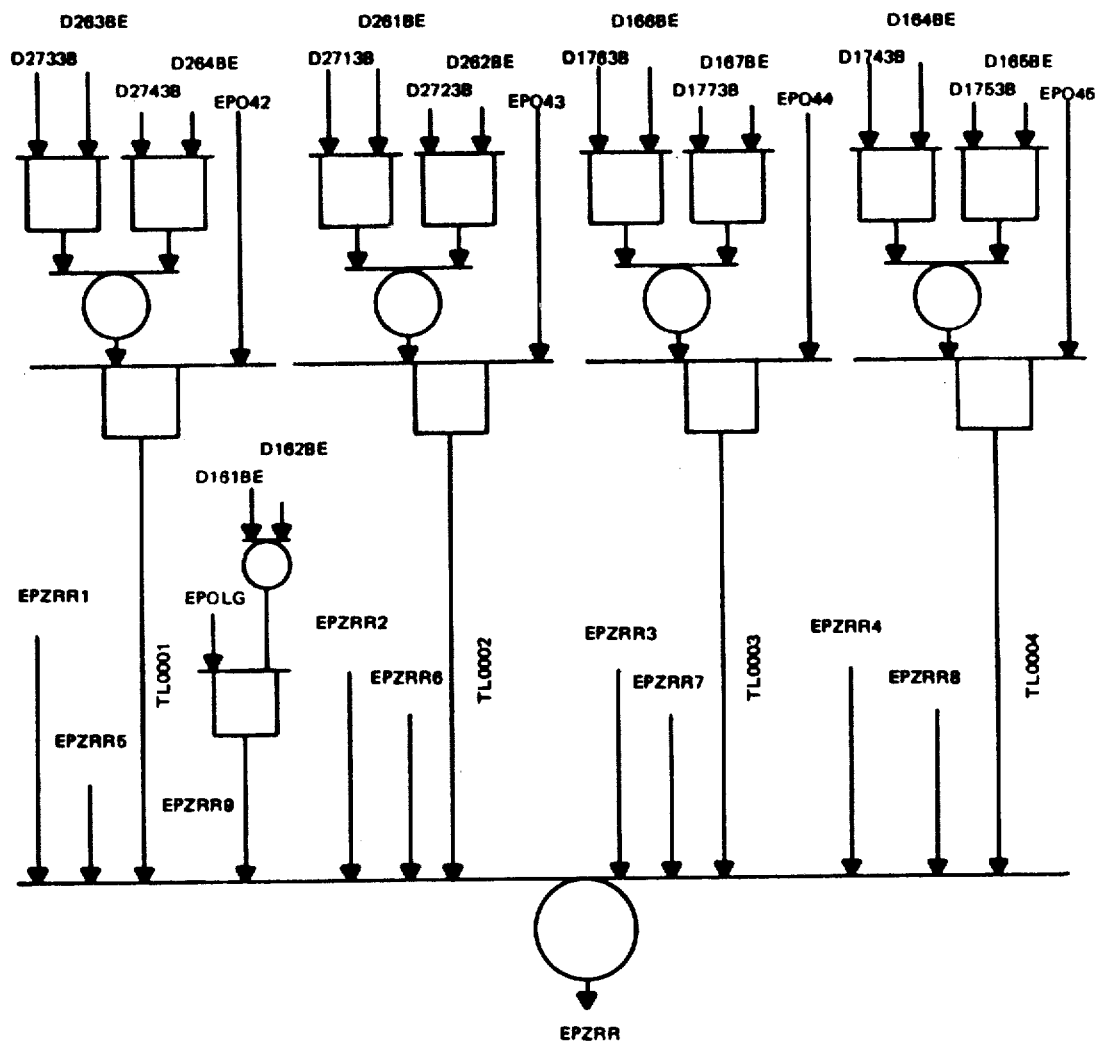
FIG. 113/20
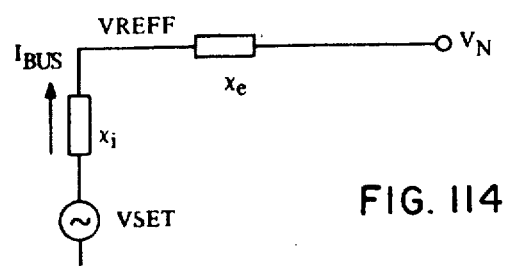
FIG. 114

METHOD AND SYSTEM FOR NUCLEAR POWER PLANT SYNCHROSCOPE SIMULATION FOR OPERATOR TRAINING

CROSS REFERENCE TO RELATED APPLICATIONS

Reference is made to the following related patent applications which are assigned to the present assignee:

1. Ser. No. 333,901 entitled "Training Simulator For A Nuclear Power Plant" and filed by G. L. Gregg, R. E. Putman and J. W. Gomola on Feb. 23, 1973.

2. Ser. No. 335,286 entitled "Nuclear Power Plant Training Simulator System And Method" and filed by R. W. Ferguson and R. E. Converse on Feb. 23, 1973.

3. Ser. No. 335,295 entitled "Nuclear Power Plant Training Simulator Modeling Organization And Method" and filed by W. H. Alliston on Feb. 23, 1973.

4. Ser. No. 335,181 entitled "Training Simulator For Nuclear Power Plant Reactor Monitoring" and filed by W. H. Alliston, F. R. Czerniejewski and B. A. Mutafelija on Feb. 23, 1973.

5. Ser. No. 335,288 entitled "Training Simulator For Nuclear Power Plant Reactor Control Model And Method" and filed by F. R. Czerniejewski on Feb. 23, 1973.

6. Ser. No. 335,294 entitled "Training simulator For Nuclear Power Plant Reactor Coolant System And method" and filed by W. H. Alliston and A. A. Desalu on Feb. 23, 1973.

7. Ser. No. 335,285 entitled "Engineered Safeguards Systems And Method In Nuclear Power Plant Training Simulator" and filed by A. A. Desalu on Feb. 23, 1973.

8. Ser. No. 335,391 entitled "Fluid Distribution Network And Steam Generators And Method For Nuclear Power Plant Training Simulator" and filed by W. H. Alliston, S. J. Johnson and B. A. Mutafelija on Feb. 23, 1973.

9. Ser. No. 335,183 entitled "Training Simulator And Method For Nuclear Power Plant Heater And Non-Linear Modeling" and filed by B. A. Mutafelija on Feb. 23, 1973.

10. Ser. No. 335,293 entitled "Secondary System Modeling And Method For A Nuclear Power Plant Training Simulator" and filed by S. J. Johnson on Feb. 23, 1973.

11. Ser. No. 335,287 entitled "System And Method For Xenon Acceleration In Training Simulator For Nuclear Power Plant" and filed by F. R. Czerniejewski on Feb. 23, 1973.

12. Ser. No. 341,193 entitled "Method And System Of Simulating Nuclear Power Plant Count For Training Purposes" and filed by W. H. Alliston and R. H. Koenig on Mar. 14, 1973.

BACKGROUND OF THE INVENTION

The present invention relates to the full-scope real-time simulation of the dynamic operation of a nuclear powered electrical generating plant for training plant operators.

The increasing demand for well trained power plant operators together with the complexity of modern day power plants, has led to the realization that the simulator is the most effective tool for such training.

Also, with advancements in nuclear power plant technology, experienced operators from time-to-time need retraining in order to be competent. An actual nuclear plant cannot provide the operator with the required experience, such as starting up, changing load, and shutting down, for example, except after years of experience; and even then, it is unlikely that he would observe the effect of important malfunctions and be able to take the best corrective procedures.

Although simulators have been used for many years, in power plant design, it is only recently that they have been used for power plant operator training. An article in the July 22, 1968 issue of "Electrical World," entitled "Nuclear Training Center Using Digital Simulation" briefly describes the installation of a boiling water reactor plant simulator. An article in the same publication in the Oct. 6, 1969 issue entitled "Huge Simulator to Ready More Reactor Operators" discusses the proposed installation of a pressurized water reactor simulator. In Volume 10, No. 5 of the publication "Nuclear Safety" published during September and October, 1969 is an article entitled "Training Nuclear Power Plant Operators With Computerized Simulators;" and in the Jume, 1972 issue of the publication "Power Engineering" there is an article entitled "Simulators" which describes a number of power plant operator training simulators presently in use or proposed.

Design simulators usually cover only a small part of the process, and may run slower or faster than realtime; while training simulators must operate and respond in a manner identical to the actual plant. A design simulator may involve only a narrow range of conditions, while a training simulator must simulate from "cold" shutdown to well beyond normal operating conditions. A design simulator usually involves only the major process, while a training simulator should cover every auxiliary system with which the plant is concerned.

Further, the full-scope simulation of a nuclear power plant for operator training is of such extensive scope that it is advantageous to provide as many modeling simplifications as possible within the limits of steady-state and transient accuracy. The mathematical modeling of a nuclear power plant is concerned with material, energy and volume balances, which often result in mathematical variables such as temperature, pressure, material flows and flow rates, concentration of materials, specific volumes and enthalpies, mechanical speeds, vibrations, electrical current, voltage and frequency, etc.

Training simulators presently in use for operator training, which are more or less complete in their simulation utilize a digital computer that is connected to control consoles that are identical in operation and appearance to the plant being simulated. Also, an instructor's console is connected to control the simulator, introduce malfunctions, initialize the simulated plant at selected states of operation, and perform other functions useful for training purposes and control of the simulator. These computers have been of the same type used for aircraft training in some instances and process control in others.

The secondary portion of the power plant which is concerned with steam generation, turbine operation, and power output is a closed system that involves many operational situations. In order to have an accurate simulation under all conditions of operation, it should take into consideration every cause and effect that relates to actual plant operation.

For example, in an actual plant the main generator control panel has a rotatable dial operated by a servo motor which is termed a synchroscope. The servo motor is connected across a circuit breaker in such a manner that the dial is operated in accordance with the difference between the frequency and phase of the voltage to be connected (running voltage) and the voltage on the line (incoming voltage). The angular position of the dial corresponds to the difference in phase between the two voltages to be connected; and the direction and speed of the dial correspond to the difference in frequency between the two AC voltages.

Prior to closing the circuit breaker, the phase and frequency of both voltages should be the same, i.e., the synchroscope dial should be motionless, which corresponds to identical frequencies; and the pointer on the dial should be in a certain angular position which corresponds to the same phase relationship. Then the generator being cut in the line can be run up or back depending on the synchroscope dial. Without the synchroscope, an operator could possibly close a circuit breaker to connect two voltages of different frequency which could cause one generator to motor, or if the phase were different, cause the generator to snap to a different angular position, thus bringing one voltage in phase with the other. Either of these conditions are injurious to the generator and motive power involved.

In simulating the operation of the synchroscope, it is necessary that it operate accurately under all possible conditions of plant operation; that is, when the main generator is being cut into a line that is already supplied by either another power plant, or one or more diesel generators in the power plant; or when one diesel generator is being put on the line with another diesel generator; or when a diesel generator is being put on the line with the main generator.

Also, it is necessary that under conditions of different frequencies, that the dial is smooth running without being able to detect any incremental movements caused by a change in frequency; and that after a particular simulated circuit breaker is closed that the in phase relationship remain stable.

In carrying out the above, it is desirable to provide simplicity and economy of organization with the least amount of hardware and programming. To perform phase angle calculations digitally would be costly because of the tremendous number of calculators required during each time step of the computer. Further to provide a complete digital simulation of the frequency differences would render it costly and also difficult to operate the synchroscope dial smoothly. Under the circumstances, it is desirable to provide a hybrid simulation arrangement wherein the frequency differences are calculated digitally and then a resultant signal is converted to an analog value which is further converted to an alternating current signal for operating the synchroscope.

In carrying out the simulation in the above hybrid manner it is also desirable to use as little hardware as possible. Thus, instead of utilizing a conversion circuit for each of the voltages to be compared, it is desirable to use only one.

Further, it is desirable to simplify the selection procedure digitally to eliminate all the conditions that could occur except the one that exists for the voltage to be compared.

SUMMARY OF THE INVENTION

According to the broad principles of the present invention, a method and system for the real-time simulation for training purposes of the dynamic operation of a nuclear power plant including a circuit breaker panel with a synchroscope utilizes apparatus wherein a control console with a plurality of manually operable devices provide input data and respond to simulated physical values provide output data for a plurality of indicating devices. A computer calculates physical values corresponding to system operation in accordance with the input data to provide output data for operating a synchroscope indicator. In a more specific aspect, simulation of the synchroscope is characterized by a hybrid network wherein an incoming voltage and a running voltage are digitally simulated to produce an output representative of the simulated voltage differences which is added to a normalized bias factor. The normalized digit is converted to an AC voltage which is applied to one side of the synchroscope servo motor; and the other side is connected to a reference voltage which results in the synchroscope operating in accordance with the digital frequency difference. The closing of the simulated circuit breaker substitutes the reference or voltage for the controlled AC voltage.

In another aspect, the method and system provides a calculated difference voltage for each possible condition of plant operation during each time step. Then program means select the appropriate difference voltage and the normalizing factor in accordance with simulated plant devices to apply to a digital to analogue converter for operating the synchroscope. The system and method for selecting the digital difference value to be applied includes a method and system for eliminating the inappropriate difference voltages by determining the running voltage bus in response to operation of a manual switch; the presence and source of a voltage on the running voltage bus in accordance with simulated circuit breakers and electrical generating sources; the presence or absence of simulated voltage on the incoming line in accordance with a synchroscope switch; and the possibility of a phase difference between running bus and incoming voltage in accordance with the position of simulated circuit breakers.

BRIEF DESCRIPTION OF THE DRAWINGS

FIG. 112 is a schematic diagram of a typical main generator and exciter for a system of the type simulated in accordance with the present embodiment of the invention;

FIG. 112/1 is a schematic diagram illustrating the functions of the simulated generator voltage regulator;

FIG. 113 is a schematic block diagram illustrating the numerical calculations in the C machine and the analog signal flow that produces the variable frequency signal in accordance with the simulation;

FIG. 113/1 is a schematic diagram of the hardware utilized in the simulation of the synchroscope;

FIGS. 113/2 through 113/5 inclusive and FIGS. 113/7 through 113/20 inclusive diagrammatically illustrate the synchroscope logic simulated in accordance with the present embodiment of the invention;

FIG. 113/6 is a single line schematic diagram to illustrate the possible synchronizing operations that can occur on a particular bus in accordance with the present embodiment of the invention;

FIG. 114 represents an analogous electrical network to illustrate the calculations of the reactive power and current in the tie bus.

GENERAL DESCRIPTION OF SIMULATED NUCLEAR POWER PLANT

Figure 1:
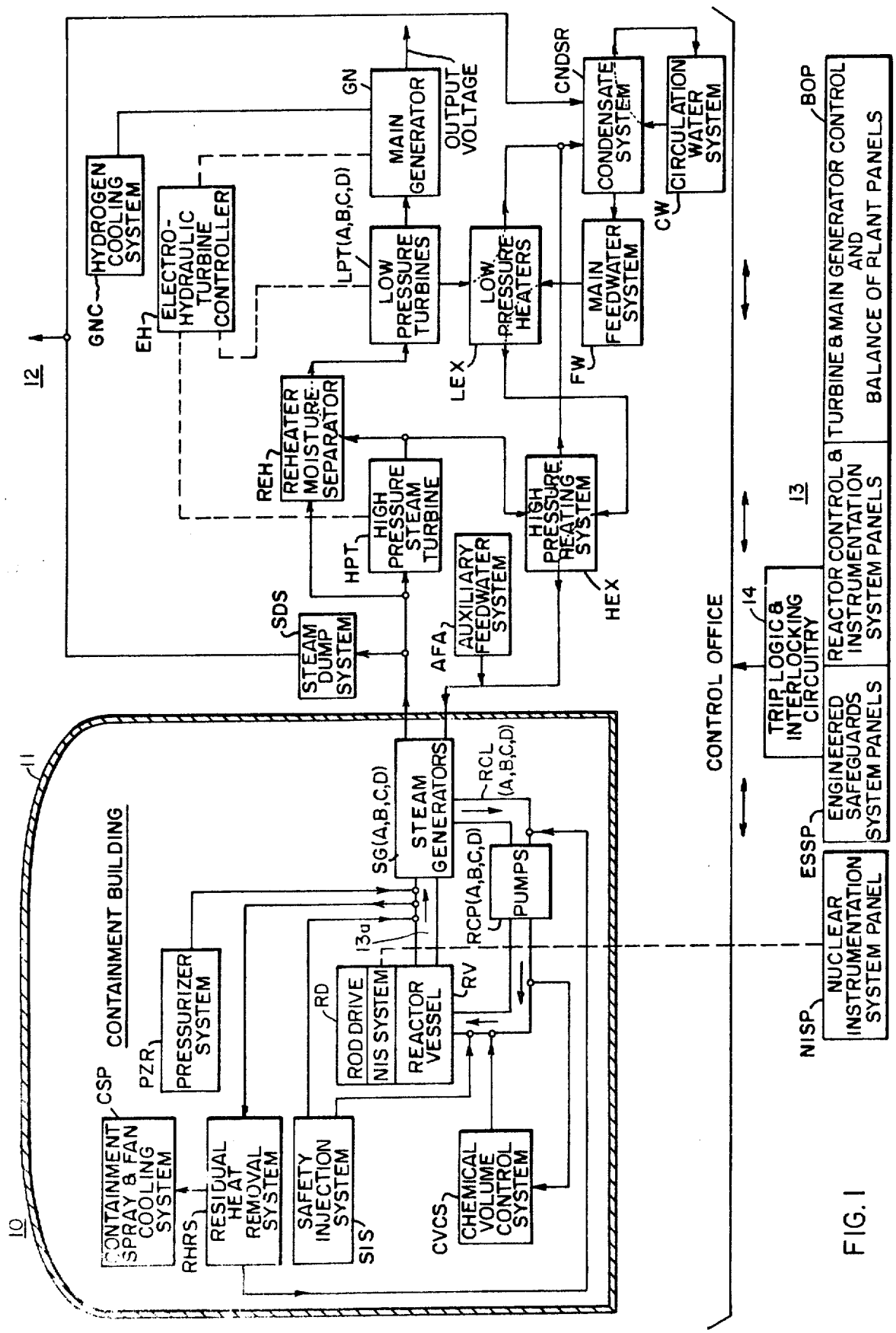
FIG. 1 shows a schematic block diagram of a nuclear powered electrical generating plant that is simulated in accordance with the present invention.

Referring to FIG. 1, the preferred embodiment of the invention is described in connection with the simulation of a nuclear power plant, in this case a four loop pressurized water reactor power plant. Such a plant includes a primary system generally referred to as 10 which is housed in a containment building 11, a secondary system, generally referred to as 12, and a control office that includes control and indication panels 13 for operating and monitoring the various elements in the power station. The plant itself is described herein in a general sense to an extent which will aid in understanding the invention. More detail on the plant is ascertainable from the more detailed invention description herein. Extensive background information on nuclear plants of various kinds is widely available in prior patents and publications. Certain invention features are applicable to nuclear plant types other than the pressurized water type.

The primary system includes a nuclear reactor housed in a reactor vessel RV and in this instance four closed reactor coolant loops RCL (A, B, C, and D), connected in parallel to reactor vessel RV. Each loop contains a reactor coolant pump RCP (A, B, C, and D) and a steam generator SG (A, B, C, and D). The reactor vessel RV, reactor coolant loop piping RCL, pumps RCP, and primary side of steam generators SG, all form what is referred to as a reactor coolant system RCS. The primary system 10 also includes an electrically heated pressurizer system PZR and certain auxiliary systems hereinafter described.

High pressure water circulates through the reactor vessel RV to remove the heat generated by a nuclear chain reaction within a fuel arrangement disposed in the reactor. This heated water exits from the reactor vessel RV and passes via the coolant loop piping RCL to the steam generators SG. In the steam generators SG, the coolant water gives up its heat to the feedwater in the secondary side of the steam generator SG to generate steam for a turbine driven electrical generator GN. The reactor coolant cycle is completed when the coolant is pumped back to the reactor vessel RV for reheating in the nuclear reactor.

Rod drive system RD is used to control reactor power level and consists of clusters or bank of movable cylindrical neutron absorber rods. The absorber rods move within guide tubes in certain fuel assemblies in the reactor fuel arrangement. The reactor coolant pumps RCP are vertical single stage mix flow pumps of the shaft type; and are designed so that adequate coolant flow is maintained to cool the reactor core adequately under all conceivable circumstances. The steam generators SG are vertical U-tube units that contain integrally therewith, in the secondary side, moisture separation equipment that reduces the moisture content of the steam to one-quarter percent or less. The electrically heated pressurizer PZR connected to one of the four reactor coolant loops RCL maintains the reactor coolant system RCS pressure during normal operation, limits the system coolant pressure variation during plant load transients, and keeps the system coolant pressure within design limits during abnormal conditions.

The reactor operating level is controlled inherently by a negative temperature coefficient of reactivity of the water; by control rod cluster positioning as already indicated; and by a soluble neutron absorber, such as boron in the form of boric acid. The boric acid is inserted into the coolant during cold shutdown, partially removed during startup, and adjusted in a concentration during the life time of the fuel in the core to compensate for such effects as fuel consumption, and accumulation of fission products, which tend to slow the nuclear chain reaction.

The primary system includes engineered safeguard systems, ESS including chemical and volume control system CVCS, safety injection system SIS, residual heat removal system RHRS, containment spray and fan cooling system CSP, and an accumulator discharge system (not shown) which is described in detail in connection with the description of the individual models.

The chemical and volume control system CVCS performs a number of functions, such as filling the reactor coolant system RCS, providing a source of high pressure water for pressurizing the system RCS when cold, maintaining the water level in the pressurizer system PZR when the RCS system is hot, reducing the concentration of corrosion and fission products in the reactor coolant, adjusting the boric acid concentration of the reactor coolant, and providing high pressure seal water for the seals of the reactor coolant pumps RCP.

The residual heat removal system RHRS portion of the engineered safeguard systems ESS transfers heat energy from the reactor core and the system RCS during plant shutdown and refueling operations. Components in the residual heat removal system RHRS are also employed in conjunction with the safety injection system SIS.

The safety injection system SIS supplies borated water to the system RCS to limit the fuel rod cladding temperature in the unlikely event of a loss of coolant accident. Also, the system SIS functions to provide a means of introducing a spray of borated water into the containment 11 as an additional dynamic heat sink. The system SIS includes several independent subsystems characterized by equipment and flow path redundancy. This redundancy assures complete reliability of operation, and continued core cooling even in the event of a failure of any single component to respond actively as intended. For example, during the passive accumulator injection phase of the system operation which is described in connection with the individual models, accumulator tanks rapidly inject borated water into the reactor coolant system automatically when the depressurization of loops RCL causes a reversal of the pressure drop across the accumulator check valves. The accumulators provide rapid cooling of the reactor core for large breaks which would otherwise result in core uncovering and overheating before the electrically driven low head safety pumps of the SIS system are energized and delivering coolant. The low head system of safety injection provides for injection of borated water into the RCL loops for large breaks, which would result in rapid blowdown and depressurization. A high head system for injection into the loops RCL for small breaks is provided for those instances that would result in slow blowdown and depressurization. The low head system utilizes pumps of the residual heat removal system RHRS which takes water from a refueling water storage tank, and pumps borated water through one of the residual heat exchangers, through an injection header and injection lines to each of the reactor coolant loops. The high head safety injection phase utilizes two subsystems which provide extremely rapid response to an SIS system actuation signal, utilising a boron injection tank and a charging pump of the chemical and volume control system CVCS.

The containment building 11 completely encloses the entire primary system and insures that an acceptable upper limit for leakage of radioactive materials to the environment is not exceeded, even if gross failure of the elements contained therein were to occur. The containment spray system CSP is included in the primary system to limit the pressure in the containment atmosphere to below the containment design pressure, and remove sufficient iodine from the containment atmosphere to limit the radiation doses to safe value. This system delivers NaOH to the space within the containment building 11. The reactor containment fan cooling system portion of CSP which is also part of the containment building monitoring system removes heat from the containment building during normal operation, and during any loss of coolant accident. When a loss of coolant accident is sensed, the fan motors are automatically switched to low speed to provide circulation of the steam-air mixture in the containment building.

The steam generators SG (A, B, C, and D) deliver steam at appropriate pressure and temperature in the secondary system for conversion to mechanical and then to electrical energy in the turbines and the generators, respectively. The secondary steam is additionally used for various operational auxiliary services such as turbine shaft steam seals, turbine drives for main and auxiliary feedwater pumps and steam jet air ejectors.

Steam is admitted to a double flow high pressure turbine HPT that is controlled by governor valves with quick acting throttle or stop valves ahead of them for rapid isolation in an emergency. Four separate pipes convey steam from the governor valves to the turbine nozzle chambers. The steam passes through an impulse blading or control stage and a number of reaction stages of the high pressure turbine HPT; the impulse chamber steam pressure is measured and used as a load measurement for use in reactor control.

On leaving the last row of high pressure blades, the steam has a moisture content of approximately 10 percent. Thus, the steam is then passed through a moisture separator and reheater REH to improve the turbine efficiency and reduce the low pressure turbine exhaust moisture. The exhaust steam from the high turbine when first passed through the moisture separator portion REH removes approximately 10 percent of the flow which is extracted as moisture. The remaining 90 percent flows through steam heated reheater portion of REH where it receives approximately 100°F superheat. The moisture is removed and drained to a heater drain tank (not shown); and the steam which rises above the moisture separator passes over the reheater and is reheated by live steam.

The hot reheated steam is conveyed to the double flow low pressure turbines LPT (A, B, C) the number of which in use can depend on the electrical output required. The low pressure turbine exhaust directs the steam to a condenser CNDSR that has cooling water passing through tubes which condense the steam to water where it is collected in a chamber, called a hot well. The condenser cooling water is controlled by circulating water system CW. The condensate system CNDSR and the feedwater system FW return the condensed steam from the turbine condenser, and the drains of the regenerative feed heating cycle, to the steam generators SG (A, B, C, and D) while maintaining the proper water inventories through the cycle.

The feedwater system FW conveys the feedwater through low pressure heaters LEX and then through high pressure heaters HEX to the generators SG. The auxiliary feedwater system AFA is used when the main system is inoperative. These systems automatically maintain the water level of the steam generators SG during both steady-state and transient operation.

The turbine HPT is equipped with an electrohydraulic control system EH comprising a solid state electronic controller and a high pressure fluid supply. The electronic controller computes a control signal based on measured turbine speed, measured first stage steam pressure, and speed and loss reference values established by the dispatcher or initiated at the operator's control panel 13. The control signal is transmitted to the electrohydraulic actuator of each main steam throttle and/or governoring valve to produce the valve positioning needed to meet the reference load. During turbine startup, the throttle valves are position controlled to accelerate the turbine from turning gear or higher speed up to synchronous speed. The high pressure hydraulic fluid system provides the power for all turbine steam control valves, electrohydraulic actuators, and positions the governor valves in response to the electric control signals from the electronic controller. The interceptor valves are also operated by the hydraulic fluid, and they may be position controlled or simply controlled to be either open or closed.

The electrohydraulic control system provides turbine control during all phase of operation by varying the turbine valve openings. Hydraulic cylinders move the valves to the required opening with electrically operated servo-valves controlling the cylinder's position.

The main generator GN operated by the turbine is a hydrogen inner cooled synchronous generator with a water cooled stator and an output voltage of approximately 22 to 25 kV at 60 cycles. The excitation is provided by a shaft driven air cooled brushless exciter. Cooling for the generator is provided by system GNC whch circulates hydrogen at a pressure of about 75 psig through the generator GN by fans attached to the generator shaft.

Various plant parameters including reactor parameters, coolant and steam pressures, temperature, and flows and liquid levels in the various systems, as well as the speed of the turbines and electrical output of the generator are sensed and displayed through meters, alarms, and annunciators on the central office panel 13. Among the reactor parameters the position of the rods of the reactor and the state of all operable components are displayed to inform the operator of the condition or state of operation of the nuclear power plant.

The state of operation of the various components of the plant and certain fluid pressures, temperatures, and levels are connected through interlocking and logic circuitry 14 to prevent unsafe operation of selected system components and to trip or shut down the plant under abnormal conditions.

Nuclear instrumentation panel NISP is provided with various recorders, indicators, meters, and selector switches to display the neutron flux in various sectors of the reactor, both in an axial and radial direction, which function is termed in-core flux mapping.

Also, a portion of the panel NISP displays through meters the flux in various sectors of the reactor vessel RV to inform the operator of the various ranges of nuclear flux, such as source, range, intermediate range, and power range of the reactor during start-up and shutdown, which operation is termed ex-core radiation detection. Further, the temperature of individual fuel rods of the reactor, and the radiation in various parts of the plant are monitored and displayed on the panels NISP. Finally, the auxiliary power to the plant is controlled by a portion of the panel NISP.

GENERAL DESCRIPTION OF SIMULATOR CONFIGURATION

The nuclear power plant simulator according to one embodiment of the invention comprise digital computation apparatus and peripheral equipment operatively connected to control and indication panels which are identical in appearance and wiring to the actual control and indication panels of the four loop pressurized water reactor power plant that is simulated. The general function, structure, and operation of digital computers is set forth in a publication entitled "Electronic Digital Systems" by Mr. R. K. Richards, which was published in 1966 by John Wiley and Sons, Inc. and bears the Library of Congress card catalog number 66-17618, to which reference is made for a detailed description thereof in order to aid in an understanding of the apparatus and methods in carrying out the invention.

Figure 2:
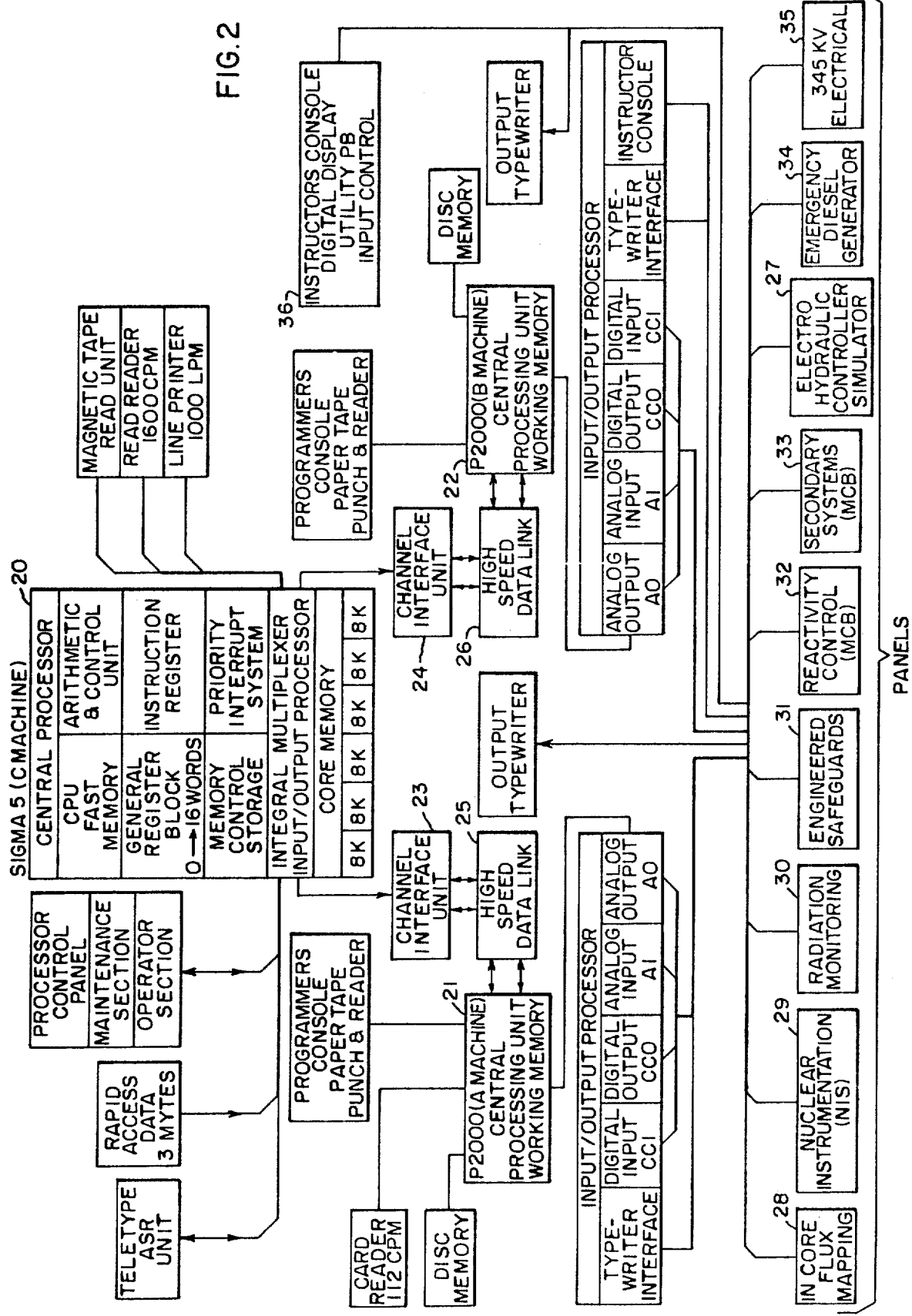
FIG. 2 shows a schematic block diagram of the apparatus used in simulating the operation of the plant shown in FIG. 1.

Specifically, and referring to FIG. 2, the simulation system includes a Sigma 5 digital computer 20 referred to at times in this specification also as the "C" machine and associated peripheral equipment. The Sigma 5 computer system is manufactured and sold by Xerox Data Systems, Inc. and has been in general use for over one year prior to the filing date of this application. For more information on the Sigma 5 computer system reference is made to the appendix.

The simulator also includes digital computers 21 and 22 referred to at times hereinafter also as the "A" machine and "B" machine, respectively and associated peripheral equipment of the type manufactured and sold by Westinghouse Electric Corp., and which is known as model P2000, and which computers have been in general use for over 1 year prior to the filing date of this application. The P2000 digital computers 21 and 22 are described in a publication entitled "Prodac 2000 Computer Systems Reference Manual" copyrighted in 1970 by Westinghouse Electric Corp. and bears copyright Registration No. A244775, to which reference is made to aid in an understanding thereof.

The Sigma 5 computer, or C machine provides an extensive arithmetic capability for the power plant simulator. The computers 21 and 22, act as process input/output controllers for the C machine. In practicing many features of the invention, a single computer or other multiple computer arrangements may be employed.

Communication between the A, B, and C machines is provided by a combination of the Xerox Data Systems Model 7650 channel interface units 23 and 24, and high speed data link devices 25 and 26 respectively, described more fully hereinafter. The C machine provides the software control and synchronization for the multiple computer configuration involving the A machine, B machine, and C machine; and the A and B machines in addition to providing the process input/output capability for the C machine also provide a capability for instantaneous simulator responses through their external interrupt system, the processing of all interlock and protection system logic, and the processing of several employed in the simulator models, such as a reactor control rods program. The significant hardware features associated with each of the A and B machines as shown in FIG. 2 included in the appendix. The major C machine hardware subsystems illustrated in FIG. 2 and utilized in the present embodiment of the invention are also included in the appendix to this specification.

The simulation of the electrohydraulic control system EH as depicted in FIG. 1 and represented by a simulator panel portion 27 of FIG. 2 is accomplished in part by the actual analog electrohydraulic controller manufactured and sold by Westinghouse Electric Corp., which has been in use for more than a year prior to the filing date of this application. The panels 27 through 35 in FIG. 2 provide the same outward appearance and operation as panels in an actual plant and are connected directly through appropriate computer system equipment to the A machine and the B machine.

Instructor's console 36, which provides the control facility to start, stop and manipulate the simulator is connected to software in the B machine.

A basic real time batch monitor (hereinafter referred to as RMB) software system of the C machine is a two partition system designed for normally running simultaneously foreground and background programs. The foreground programs include the system software extension programs which are made up of a sublevel processor, data link handler, and disc handler. Such foreground programs also include data conversion routines, and various dynamic models for the simulated system, which include reactor models, primary system models, secondary system models, a valve handler routine, a pump handler routine, and a controller handler routine. In order to permit an economy in core memory requirements, in the present embodiment of the invention the foreground programs and the background programs are not run at the same time.

CONTROL PANELS

In controlling an actual nuclear power plant of the type being simulated, the individual control devices such as selector switches, levers, and pushbuttons close contacts to select certain components for operation, to energize motor operated valves, solenoids, and relays; and through a protective system of logic to select, or change the position or condition of various components for starting up, varying operation, shutting down, providing emergency measures in the event of malfunction, and testing components in subsystems of the plant. In addition, certain plant components or subsystems function in automatic control loops to which there are typically applied one or more monitored plant variables as feedback signals.

In monitoring the operation of an actual plant, temperature, pressure, flow, level, flux, and other physical measurements are detected by appropriate sensing devices which transmit such information to the control panels for operating meters, recorders, and indicators. As already indicated certain monitored variables are also used for control.

In realistically and accurately simulating the control and monitoring of a nuclear power plant in accordance with the present embodiment of the invention, such control panels together with the control and monitoring devices are an exact replica physically and operatively, of the plant being simulated. However, in simulating the system in accordance with the present embodiment, the control and monitoring devices of the control panels are wired to each other, and to turbine EH controller; and also to contact input and contact output terminals, respectively, on the A or B machines. The panel interface logic and the plant protective logic are contained in both the A and B machines as hereinbefore mentioned. The control consoles permit the student operator to control and monitor the operation of the plant in the same manner as the operator of an actual plant. For example, he can start up, increase the power, shut the plant down, and restart. At any time the instructor can change physical values or malfunction the models as previously described. Then the operator can change the operation of the plant to correct the malfunction or introduce emergency measures as required. The student is able to see realistically in real-time the consequences of any action that could be taken in the real plant.

In detailed drawings of the control panels, descriptive legends are associated with appropriate control and monitoring devices in a manner similar to an actual installation; and in addition thereto, software symbols in many instances are used to identify specific control panel devices with the same software symbol being used to identify the component being operated by such devices in the schematic diagrams of the actual system being simulated. In other instances, the actual valve number is used to the schematic diagram and the control panel where it will aid in understanding the simulation of the system.

MAIN GENERATOR AND EXCITATION

The main electrical generator being simulated according to the present embodiment of the invention is a hydrogen inner cooled synchronous generator with a water cooled stator. It has a power factor of 0.9 and has a three-phase 60 cycle output voltage of 22 to 25 kV. The rotating field of the generator is energized by an air cooled brushless exciter driven on the turbine generator shaft. Referring to FIG. 112, a permanent magnet pilot excitor G100 is a high frequency permanent magnet generator which provides power to a voltage regulator G11 which in turn controls a stationary field G12 of alternating current exciter G13. The output from the rotor of the AC exciter is fed along shaft G15 to silicon diodes G16 mounted on the shaft. The rectified diode output in turn controls field winding G17 of the main generator G18.

The portion of the control panel illustrated in FIGS. 93S through 93X inclusive illustrates the controls and the indication for the main generator.

In simulating the excitor generator, referred to in FIG. 112, the generator megawatt output MW is assumed to be equal to the total turbine power when the generator breaker is closed. Further, the exciter is assumed to affect the generator terminal voltage directly, rather then controlling the voltage behind transient reactance. Also, in solving the dynamic electrical equations of the generator field, flux linkages are assumed proportional to the terminal voltage, rather than the voltage behind the transient reactance. Finally, when the voltage regulator is in service, the terminal voltage is set equal to the voltage adjustment setting. This assumption is based on the premise that the voltage regulator exerts rapid and precise control over the terminal voltage.

The exciter generator model T53 (program EXGENM) simulates the electrical characteristics of the electrical generator, as well as the control functions of the exciter. The model comprises a voltage source behind a synchronous reactance with negligible armature resistance. The equations for the exciter generator model are derived on a per unit basis. The equations that are utilized are programmed in their normal electrical units.

The inputs to the subroutine EXGENM include total turbine power GNUM which is calculated in the subroutine RHMSEP; the base adjuster position GNCVOL (see FIG. 93U) which is received from the valve handler VCHAND; the generator breaker status (see FIG. 93T), which is received from the B machine; the regulator mode logicals that indicate "not off" and "on" (D1813Y and D1813Y) which are received from the B machine; and the voltage adjustment potentiometer GE06 setting D192IP which has a range of from 0 to 8,192 which is also received from the B machine.

The outputs of the program EXGENM include the electrical megawatts (GNUE) that are generated and the electrical megavars (GNUR) that are generated. Also, the outputs include the generator terminal voltage GNVT, and the voltage regulator GE04 output GNVR.

The exciter generator model according to the present invention is capable of simulating the operation of the generator with the generator breaker TT01 either opened or closed; the operation of the generator with the voltage regulator GE04 in either the off, test, or on modes; the manipulation of the base adjustment GE05 control and voltage adjuster GE06 control; and the generator output changes due to turbine load variations.

The generator terminal current (in per-unit) $I$ at rated power is determined from the rated power factor of 0.9 according to the following equation:
$$\vec{I} = 0.9 \times 1.0 - j\sqrt{1.0 - (0.9)^2} = 0.90 - j\,0.436$$
Using the rated terminal current $I$, the equivalent system infinite bus voltage $\vec{V}_s$ (in per-unit) is found as follows:
$$\vec{V}_s = |V_T| - X_s\vec{I}$$
$$\vec{V}_s = 1.0 - j(0.15)(0.90 - j\,0.436)$$
$$\vec{V}_s = 0.9346 - j\,0.135$$
$$\vec{V}_s = 0.948\ <-8.22°$$
Using the synchronous reactance $X_d$ and the rated current $\vec{I}$, the rated internal generator voltage $\vec{V}_I$ is calculated as follows:
$$\vec{V}_I = |V_T| + j\,X_d\vec{I}$$
$$\vec{V}_I = 1.0 + j\,X_d[0.90 - j\,0.436]$$
$$\vec{V}_I = 2.58\ <+43.9°$$

The generator megawatt output is assumed to be equal to the total power that is developed by the turbine so that GNUE equals GNUM. The generator reactive power output Q (in per-unit) is determined from the generator terminal current $\vec{I}$ and the equivalent system infinite bus voltage $\vec{V}_s$ as follows:

$$\vec{I} = (P-jQ/|V_T|)$$
$$\vec{V}_S = |V_T| - j X_e \vec{I}$$

Combining the two equations and solving for Q:

$$Q = (|V_T|^2/X_e) - (|V_T| |V_S|/X_e) \sqrt{1.-(P^2X_e^2/|V_T|^2 |V_S|^2)}$$

Using an approximation for the square root operation:

$$\sqrt{1-X} \cong 1 - \tfrac{1}{2}X$$

$$Q \cong |V_T|^2/X_e) - (|V_T| |V_S|/X_e) + \tfrac{1}{2}(P^2X_e/|V_T| |V_S|)$$

Since the following conversions are true:

$GNUE = P(MVA_R)$
$GNUR = Q (MVA_R)$
$GNVT = V_T(KV_R)$

The equation that is used in the model EXGENM is as follows:

$$GNUR = [GNVT^2/(KV_R^2X_e/MVA_R)] - (GNVT \; V_SMVA_R/X_eKV_R) = \tfrac{1}{2}[GNUE^2X_eKV_R/(GNVT-V_SMVA_R)]$$

where:

$(KV_R^2X_e/MVA_R) = [(25)^2 \; 0.15/1,220] = 0.0771$
$(V_SMVA_R/X_eKV_R) = [(0.948) \; 1220/0.150(25)] = 306.0$
$(X_eKV_R/V_SMVA_R) - [(0.15) \; 25/(0.948)1,220] = 1.64 \times 10^{-3}$ Where GNVT is the generator terminal voltage, $MVA_R$ is the generator rated megavars, $KV_R$ is the generator terminal voltage at rated condition, $X_e$ is the external reactance to infinite bus, in per-unit.

Utilizing the previous stated equation for terminal current $I$, $$|I| = \sqrt{(p^2+Q^2)/V_T}$$

for the simulation program, the following expression is used where GNITRM is the generator terminal current. The voltage behind the synchronous reactance $V_I$ is solved by combining the two equations as follows:

$$\vec{V}_I = |V_T| + jX_d\vec{I}$$

and $$\vec{I} = (P-jQ)/|V_T|$$

Then, in combining the two equations and separating the real and imaginary components, the voltage behind the synchronous reactance $\vec{V}_I$ is as follows:

$$\vec{V}_I = [|V_T| + (QX_d/|V_T|)] + j(PX_d/|V_T|)$$
$$|V_T| = \sqrt{|V_T|^2 + 2QX_d + [X_d^2(P^2+Q^2)/|V_T|^2]}$$
$$|V_I| = \sqrt{|V_T|^2 + 2QX_d + |I|^2X_d^2}$$

For the simulation program EXGENM, the following equation is used where the voltage behind the transient reactance is termed VINT:

$$VINT = \sqrt{(GNVT^2/KV_R^2) + GNUR \; (2X_d/MVA_R) + GNITRM^2 \; (KV_R^2D_d^{23}/MVA_R^2)}$$

or:

$$VINT = \sqrt{(1/KV_R) \; GNVT^2 + GNUR \; (2KV_R^2X_d/MVA_R) + GNITRM^2 \; (3 \; KV_R^4X_d^2/MVA_R^2)}$$

where:

$(2 \; KV_R X_d/MVA_R) = [2 \; (25)^2 1.998/1220.0] = 2.05$ and $(3 \; KV_R^4X_d^2/MVA_R^2) = [3 \; (25)^4(1.998)^2/(1,220)^2] = 3.16$ The generator and exciter has saturation characteristics that cause a non-linear relation between the terminal voltage $KV_R$ and the generator field current $I_F$. The saturation characteristic takes the form as follows:

$$I_F = V_I + K_S \; V_I^2$$

The fact that the deviation of the saturation line from a linear relationship is of higher order than the assumed square law, is partially compensated by the use of the voltage behind synchronous reactance $V_I$. This voltage overstates the flux that causes saturation rather than the more conventional use of voltage behind Potier reactance. The constant $K_S$ is found by considering this relation and rated condition where $I_F$ and $V_I$ known. On a per unit basis, the actual field current at rated conditions $I_{FR}$ is the field current at rated conditions divided by the field current for rated terminal voltage on the air gap line as follows:

$I_{FR} = (8,945/2,779) - 3.23$

Solving for $K_S$: Thus, to find the generator field current saturation constant $K_S$, following is used:

$K_S = (I_{FR}-V_I)/V_I^2) = (3.23-2.58)/2.58^2) = 0.098$

For the purposes of display, the exciter field current $I_{FX}$ is assumed proportional to the generator field current $I_X$. In actual operation, the generator field current lags behind the exciter field current during operation. However, this simplification eliminates the need for an additional equation; and thus a constant can be determined to relate exciter field current to generator field current. The exciter field current that corresponds to rated conditions is 245A. Hence, the exciter field current for rated voltage on the air gap line $I_{FXR}$ is as follows:

$I_{FXR} = (2,779/8,945).245 = 76.5 \; A$ so that $GNIF = VINT \; (1.0 + 0.098 \; VINT) \; 76.5$ The generator has a time lag that exists between the excitation voltage and the internal generator voltage that results from it. The transient field current relation is:

$$T'_{do} \; (dV'_I/dt) = V_x - I_F$$

For simplicity, $V_I$ is substituted for $V'_I$ to avoid the computation of another equation. When the generator breaker is open, $V'_I$ equals $V_t$. When the breaker is closed, a small error results. $V_x$ is the exciter voltage, in perunit, that produces a generator field current. This voltage is replaced by the per unit exciter field current $I_{FX}$. Thus the transient field current relation is rewritten as:

$$T'_{do} \; (d \; |V_t| /dt) = I_{FX} - I_F$$

When the voltage regulator GE04 is in either the "off" or "test" mode, the exciter field current $I_{FX}$ is determined by the base adjuster GE05 setting. Since GNCV01 represents the base adjuster setting, with the range of 0 to 1, it must be multiplied by a constant to obtain the per unit exciter field current to the generator as follows:

$I_{FX} = GNCV01 \; (I_{FXM}/I_{FXR})$

The generator field current $I_F$ is also in per-unit, and since the variable GNIF is proportional to generator field current:

$I_F = (GNIF/I_{FXR})$

The transient field current differential equation for $V_T$ becomes a difference equation for GNVT in the simulation program:

$GNVT_K = GNVT_{K-1} + KV_R \; [GNCV01(I_{FXM}/I_{FXR}) - (GNIF/I_{FXR})] \; (\Delta T/T'_{do})$ or $GNVT_K = GNVT_{K-1} + [GNCV01(GNIF/I_{FMX})] \; (KV_R \; I_{FXM} \; \Delta T/I_{FXR} \; T'_{do})$ where:

$(KV_R K_{FXM} \Delta T/I_{FXR} T'_{do}) = [25(400)0.25/76.5(6.12)]$
$= 5.339$

The regulator output meter (see FIG. 93S) displays the difference between the voltage adjuster setting and the generator terminal voltage $V_T$. The regulator multiplies the error by a gain of 1/0.005 to maintain an error of less than 0.5 percent. The regulator output or null meter is located after this gain as illustrated in FIG. 112/1 to which reference is made. This per unit signal is converted to a voltage by multiplying it by the maximum regulator output $V_{RM}$ as follows:

$V_R = [(V_{REF} - V_T)/SPN]$
$VRTMP = 22.50 + 5.0(D192IP/8,192) = 25 (V_{REF})$ so that
$GNVR = [(VRTMP-GNVT)/KV_R(SPN)] V_{RM} = (VRTMP-GNVT) GAIN$
$GAIN = [V_{RM}/KV_R(SPN)] = [10/25(0.05)] = 8.0$ The terminal voltage error required for maximum regulator output termed $V_{RM}$ has a value of 0.05 to allow reasonable control of the generator during balancing operation.

When the voltage regulator is in service, it is assumed that the generator field current is controlled such that the generator terminal voltage follows the voltage adjuster setting exactly. The gain of the regulator is quite high, and the closed loop system reduces the significance of the generator's time delay. Therefore, $GNVT$ is equal to $VRTMP$. The regulator output meter is driven more effectively by looking at the regulator output current and the base adjuster current, rather than the voltage error. The voltage error is quite small (less than 0.5 percent) but it is multiplied by a large gain. The following method is used in determining the field current that is contributed by the regulator, and inferring the voltage error and gain: the regulator output meter in per unit is follows:

$V_R = I_F - GNCV01 (I_{FXM}/I_{FXR})$

The output voltage in volts can be determined by multiplying the per-unit value by the maximum voltage of 10 V ($V_{RM}$). This maximum voltage will occur when
$I_F = 0$
and
$GNCV01 = I_{FXR}$
so that
$GNVR = V_R V_{RM} (I_{VXR}/I_{FXM})$
$GNVR = GNIF/I_{FXR} - [GNCV01 (I_{FXM}/I_{FXR})] V_{RM} (I_{FXR}/I_{FXM})$
or
$GNVR = [(GNIF/I_{FXM}) - GNCV01] V_{RM}$
with
$I_{FXM} = 400.0$
$V_{RM} = 10.0$ During normal operation, electromechanical transients are sufficiently rapid and well damped to justify the assumption that generator electrical power GNUE is equal to mechanical power GNUM. Special consideration is required in the situation where field weakening is to the point where steady-state stability is lost and the generator pulls out of step. This can be effected by too low a voltage regulator setting if the regulator is on, or too low a base setting with the regulator off, or the loss of the permanent magnet pilot exciter. If the terminal voltage falls below 22.4 kV, the generator behavior is unstable. During operation with the voltage regulator on, the minimum setting is 22.5 kV. However, if the permanent magnet generator is tripped or the base adjuster is set below a value of 22.4 kV with the regulator off, the generator loses synchronism. Then, the simulator sets the generator megawatt output to −25 MV. The reverse power relay detects this condition and trips the generator.

SYNCHRONIZING SYSTEM

The synchronizing system of the power plant being simulated includes a synchroscope and two 120 volt indicator lamps. The three-phase voltages on either side of a circuit breaker are compared by this system to determine if they are in phase and have the same amplitude. The indicator lamps are dark when the voltages are equal in phase and amplitude, and have a maximum intensity when they are completely out of phase. The synchroscope is actually a phase meter, with the pointer indicating the phase difference between two voltages. The pointer position (0° to 360°) corresponds directly to the electrical phase difference. When the pointer is motionless, the voltages have the same frequency. If the frequencies are different, the pointer rotates in the "fast" or "slow" direction, depending on the relative frequency of the "incoming" and the "running" voltages. A frequency difference of 3 Hertz for example, causes a 3 revolutions per second pointer speed. This speed is about the limit of the synchroscope; that is, greater frequency differences cause the pointer to chatter. When the incoming and running voltages are in phase and have the same frequency, the pointer is motionless and located at the 12:00 position.

When starting up the main circuit breaker is open. When the generator reaches synchronous speed and the synchroscope indicates that main generator voltage and outside voltage is synchronized the main circuit breaker can be closed.

Synchronizing System Simulation

Referring to FIG. 113, the simulation of the synchronization system is accomplished through a hybrid combination of hardware and software. The hardware provides a variable frequency signal to a synchroscope and synchronizing lights identical to those in the plant (see FIGS. 93S). This variable frequency is produced by a voltage controlled signal generator VCG that is controlled by the C machine software. Furthermore, several relays that disable, switch, or fix the input signals to the synchroscope (See FIG. 113/1) are controlled by software logic in the B machine. A phase difference at the synchroscope is produced by providing a constant 60 Hertz signal as one input, and the output of the voltage controlled generator as the other input. The variable frequency signal has a range of from 55 to 65 Hertz for example. When the running and incoming frequencies are equal, the hardware provides a 60 Hertz signal.

The voltage control signal generator VCG output frequency is determined by a dial setting on the VCG which determines the minimum frequency, and a positive DC voltage input from an analog output on the B machine increases the frequency. Since a one volt input causes a change of 40 Hertz, a ¼ volt input is required for a span of 10 Hertz. A voltage divider converts a 0 to 5 volts DC analog output to the required 0 to the ¼ volt DC signal.

FIG. 113 shows the numerical calculations in the C machine, and the analog signal flow that produces the variable frequency signal. The incoming and running frequencies ($F_1$ and $F_2$, respectively) are compared and normalized by 10 Hertz. This normalizing factor corresponds to the maximum frequency range that the hardware can produce. A normalized bias of 0.50 is added to establish a 60 Hertz signal when $F_1$ equals $F_2$. The B machine analog output converts this normalized number to a voltage that ranges from 0 to 5 volts DC. A voltage divider converts this voltage signal to a 0 to ¼ volt DC signal. The VCG produces a variable frequency signal that ranges from 55 to 65 Hertz, and this signal is amplified by a power amplifier to drive the variable phase input of the synchroscope.

FIG. 113/1, illustrates the relay contacts $B_1$ and $B_2$ which perform the switching. After a breaker that is being synchronized is closed, the frequencies $F_1$ and $F_2$ are precisely equal. The VCG is providing a 60 Hertz signal, and the pointer should be motionless. However, the output of the VCG is subject to drift which causes the pointer to wander. To eliminate this undesirable drift, the software synchroscope logic in the B machine disconnects the VCG and connects 60 Hertz power to both inputs of the synchroscope. The synchronization simulation considers only the frequency of the two signals that it is comparing. The amplitudes of the voltage signals are assumed to be either nominal or zero. If one of the voltages is zero, as determined by logic in the B machine, or if the system is not in use, both the inputs to the synchroscope are disconnected by the relay contacts $A_1$ and $A_2$. The frequency difference is correct at all times, but the actual phase difference is not. The electrical phase differences are not calculated because of limitations imposed by the existing hardware.

In a real plant, when a breaker is opened, the phase difference theoretically should be initially zero. However, in the simulated system, the phase difference depends on the drift of the VCG frequency. This means that when the breaker is opened, the pointer will snap to a non-zero reading. This action is realistic since, in a real plant, the phenomenon is caused by a momentary lag of the associated speed control of the rotating machinery.

Although the main control board has one set of simulation hardware that is connected to one synchroscope, the three Diesel synchroscopes share a single set of hardware through a switching system. The Diesel switching relays C and D (see FIG. 113/1) select the Diesel generator synchroscope A or B. When relay C is false, Diesel generator B synchroscope is selected; and when relay C is true and relay D is false, Diesel generator A synchroscope is selected. When relays C and D are true, Diesel generator 0 synchroscope is selected. This is in addition to the relays discussed above.

Referring to FIGS. 113/2 and 113/3, all the relays that have been discussed are controlled by software logic in the B machine. In addition, the correct VCG input signal is selected, according to the source of the frequencies that are being synchronized. For rapid response, all the possible combinations of frequency differences are continuously transmitted from the C machine to the B machine. A special algorithm allows logic signals to select any one value from the following frequency difference tables and output that value on the analog output.

MAIN CONTROL BOARD FREQUENCY DIFFERENCES

| | Incoming Voltage | Running Voltage | Frequency Difference Symbolic Name |
|---|---|---|---|
| 1. | Main Generator | Reference | EPNGR |
| 2. | Reference | Main Generator | EPNRG |
| 3. | Reference | Diesel Generator 0 | EPNRDO |
| 4. | Reference | Diesel Generator 1A | EPNRDA |
| 5. | Reference | Diesel Generator 1B | EPNRDB |
| 6. | Main Generator | Diesel Generator 0 | EPNGDO |
| 7. | Main Generator | Diesel Generator 1A | EPNGDA |
| 8. | Main Generator | Diesel Generator 1B | EPNGDB |
| 9. | Reference | Reference | None |

40

DIESEL GENERATOR PANEL FREQUENCY DIFFERENCES

| | Incoming Voltage | Running Voltage | | Frequency Differences Symbolic Name |
|---|---|---|---|---|
| 1. | Main Generator | Diesel Generator | 0 | EPSGDO |
| 2. | Main Generator | Diesel Generator | 1A | EPSGDA |
| 3. | Main Generator | Diesel Generator | 1B | EPSGDB |
| 4. | Reference | Diesel Generator | 0 | EPSRDO |
| 5. | Reference | Diesel Generator | 1A | EPSRDA |
| 6. | Reference | Diesel Generator | 1B | EPSRDB |
| 7. | Diesel Generator 0 | Main Generator | 0 | EPSDGO |
| 8. | Diesel Generator 1A | Main Generator | 1A | EPSDGA |
| 9. | Diesel Generator 1B | Main Generator | 1B | EPSDGB |
| 10. | Diesel Generator 0 | Reference | 0 | EPSDRO |
| 11. | Diesel Generator 1A | Reference | 1A | EPSDRA |
| 12. | Diesel Generator 1B | Reference | 1B | EPSDRB |
| 13. | Reference | Reference | | None |

Through normal sychronizing operations, frequency differences can occur on the main control and Diesel generator panel. The voltages termed "reference" is the 60 Hertz voltage that is assumed to be always present on the 345 KV system. If a bus is connected to the 345 KV system, it is assumed to have this reference frequency.

In order that a certain frequency difference may be displayed on the synchroscope, the associated logical variable must be true. For example, the main control board synchroscope displays the difference between the main generator frequency and the 60 Hertz (EPNGR) if the logical variable EPZGR is true. There are nine separate logical conditions on the main control board simulation, and they are mutually exclusive. If one logical is true, all others are false.

To determine which condition if any, is true there are four requirements that must be satisfied. The first is that the synchronizing switch for the circuit breaker that is being considered must be set. Also, there must be an incoming voltage. In order to have this voltage, an electrical path must be available and the voltage already established on that path. There must be a running voltage that satisfies the same requirements as the incoming voltage. Finally, there must be phase difference between the incoming and running voltages. If the circuit breaker that is being synchronized is closed, or if there is any parallel path that connects the running and incoming voltages, this requirement is not satisfied.

FIGS. 113/2 through 113/5 and 113/7 through 113/20 are representative of the synchroscope logic of the present embodiments and reference is made thereto as an aid to understanding the invention. Referring to FIG. 113/4, one of the main control board eight variable frequency logicals, is true, and contact output D1122U is set to enable the variable frequency signal to drive the synchroscope. Also, the contact output D1122T is set to enable power to reach synchroscope inputs. These contacts are shown as relays B and A respectively in FIG. 113/1. The 12 variable frequency logicals on the Diesel generator panel enable D5122U and D5122T. If a synchronizing operation satisfies the first three requirements above, but fails the phase difference test, the operation will probably satisfy another test which indicates that these are two voltages that are in phase. Referring to FIGS. 113/4 and 113/5, the reference versus reference logical condition (EPZRR) is true; D1122T is set true (D1122U is false) and the synchroscope will indicate a zero phase angle.

In explaining the B machine synchroscope logic, the main control board synchroscope logic is utilized as exemplary; and referring to FIG. 113/6, a single line diagram illustrates the possible synchronizing operation that can occur on bus 142 for example. This figure designates the electrical breakers and disconnects in the system. There are ten logical conditions that are found to recur throughout the logic. These have been calculated and established for use wherever required. Referring to FIG. 113/7, the logical variables (EPZSDO, EPZSDA, EPZSDB) indicate the Diesel generator O, A, and B, respectively are running and the tie breakers are closed so that they are feeding the associated nonessential 4 kilovolt busses. The logical variable on FIG. 113/8 (EPOLG) is true when the main generator is linked synchronously to the 345 KV ring bus and hence the generator's frequency is 60 Hertz. Similarly, the variable EPOLT FIG. 113/9 is true when the system auxiliary transformer is linked to the ring bus. The variable of FIG. 113/10 (EPOPG) indicates that power is available at the terminals of the generator because either the generator is producing voltage, or the generator is linked to the 345 KV ring bus. The four logical variables EPO42, EPO43, EPO44, and EPO45 of FIG. 113/11 indicate that power is available from some source on the four non-essential 4 KV busses 142, 143, 144, and 145.

FIG. 113/12 shows the main control board synchroscope logic which determines if the main generator output is being compared to the 60 Hertz reference voltage at the main feed breaker EPZGR1. To first determine what breaker, and hence which bus, is being considered, the main feed breaker synch switch must be closed. The generator voltage V1 is incoming and nonzero if EPOPG is true. Bus 142 has a 60 Hertz frequency and a running voltage for V2 if EPOLT is true and the reserve feed breaker is closed. In order to have the assumed phase difference, the reserve feed breaker must be closed, the main feed breaker must be opened, and the generator output must not be linked to the 345 KV system (EPOLG). If EPOLG is true, or the main feed breaker is closed, a path connects the incoming voltage to the running voltage is established. Hence, there cannot be a frequency difference.

Since there are five other ways that the main generator and refernce frequencies can be compared, the output of this comparison EPZGR1 is logically ORed with them (EPZGR2 - EPZGR6) to determine if EPZGR1 is true. FIG. 113/13 of the logic determines if the reference frequency is being compared with the generator frequency. The incoming voltage must be present; that is, EPOLT is true. The running voltage must be due to the main generator. Moreover, the generator frequency must be different from the 345 KV system frequency as indicated by the lack of a connection between the generator and the ring bus. There are three other ways that the same frequency difference is displayed on the synchroscope as shown in FIG. 113/14 of the synchroscope logic which shows the result EPZRG.

FIGS. 113/15 and 113/16 show how the reference frequency 60 Hertz can be compared with the Diesel frequency. This situation is extremely unlikely; however it is included for completeness. This frequency difference occurs when synchronizing the reserve feed breaker to the bus when the bus is supplied solely by the Diesel. It can also occur when the main feed breaker is being synchronized, the generator is linked to the ring bus, and the bus is supplied solely by the Diesel. The result is shown in FIG. 113/15 (EPZRDO). FIG. 113/17 shows how the main generator frequency can be compared with the Diesel frequency. Again, this condition, although unlikely, is included for completeness. When the main feed breaker is being synchronized and the main generator is not connected to the 345 KV system, and the bus is supplied solely by the Diesel generator, the logical variable EPZGDO is true.

There are several ways in which the synchronization of the main and reserve feed breakers on bus 142 cause the comparison of a frequency signal with itself. If the 60 Hertz reference voltage occurs on both sides of a breaker to be synchronized, this condition is true. FIGS. 113/18 and 113/19 show this condition for the main and reserve feed breakers. Referring to FIG. 113/20, another way that the incoming and running frequencies are identical is when a breaker that is being synchronized is closed and power is present. FIG. 113/14 previously mentioned, details the logic which ultimately controls the variable frequency signal and the power enable relay. These relays have been discussed previously and are shown in FIG. 113/1.

To tune the voltage controller generator VCG, it must be set to produce a 60 Hertz output when the electrical input signal consists of the bias signal only. This establishes the relationship such that the VCG produces a 60 Hertz output for a numerical value of 0.50 in the C machine. A software logical variable TSTSW9 in the C machine stores only the normalized bias in the locations EPNGR and EPNDRO. By using either the C machine maintenance panel or programmer's console, this test switch which is contained in the COMMON BOPTST must be set to true while the model is running. The subroutine BOPAO4 contains the executable instructions. With TSTSW9 set, the B machine programmer's console is used to set the logicals EPZGR and EPXDRO true. This will enable the synchroscopes, and the pointers will turn. By adjusting the coarse and vernier frequency potentiometers on each VCG, the pointer can be made to stop, and the VCG output frequency is then 60 Hertz. During the tuning process the model should be running and all circuit breakers and synchronizing switches inactive.

DIESEL GENERATOR SYSTEM

In the event that the normal off-site generated auxiliary power is lost, the plant auxiliaries which are essential to safe shutdown are powered by the diesel driven generators. Each diesel generator is installed to provide a reliable source of redundant on-site generated auxiliary power and is capable of supplying the engineered safety feature loads assigned to the engineered safety feature electrical system bus which it feeds. The diesel generators can run in a standby condition without being tied to the load, or supply the auxiliary power solely when connected to the load. Synchronizing equipment is provided to permit parallel operation of each diesel with the normal auxiliary power source during testing and exercising, when the diesel generators are sharing the load.

Figure 93S:
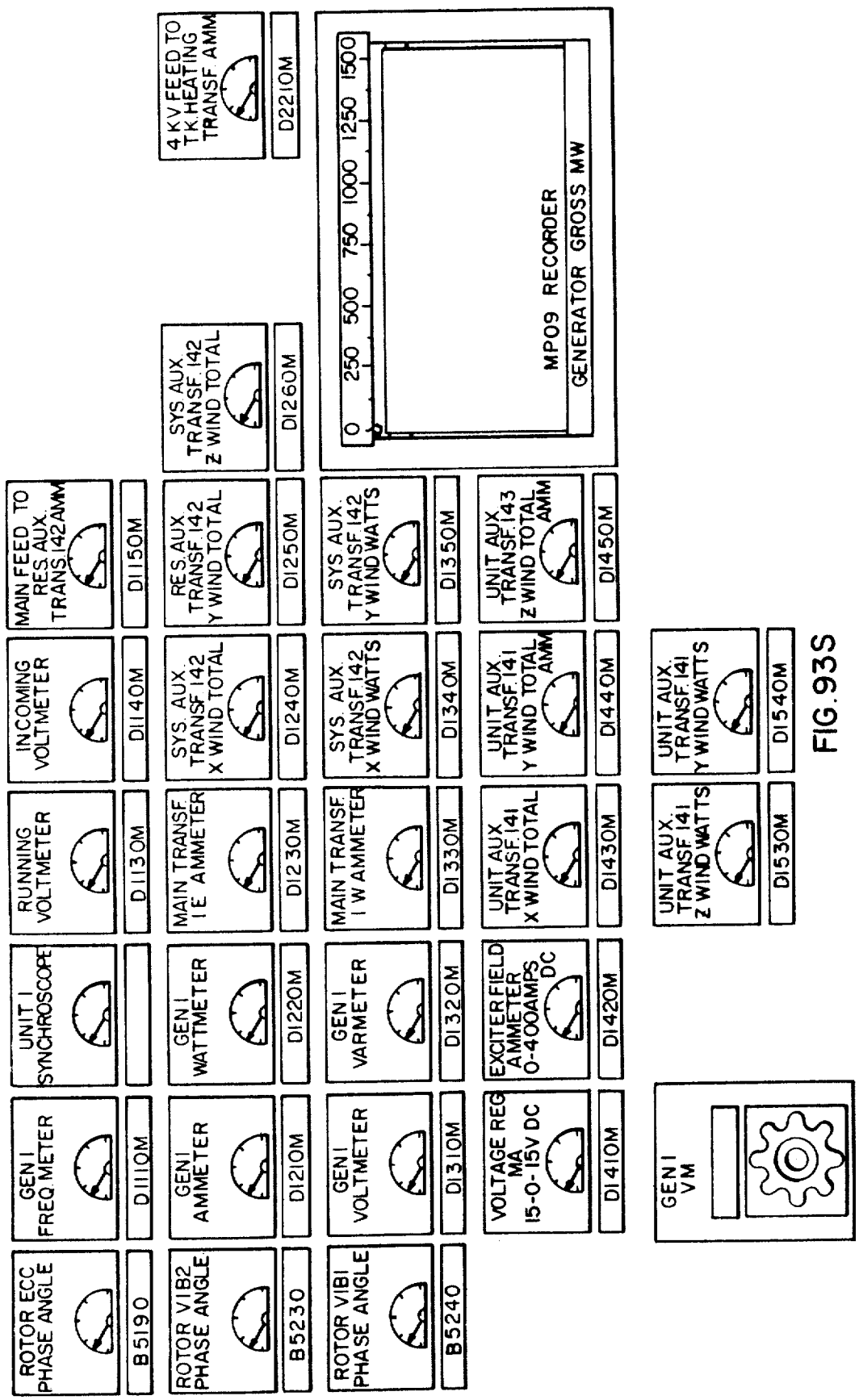
FIGS. 93S through 93Z illustrates a portion of the front view of the panels for controlling and monitoring the Balance Of Plant (BOP) of the simulator.
Figure 93U:
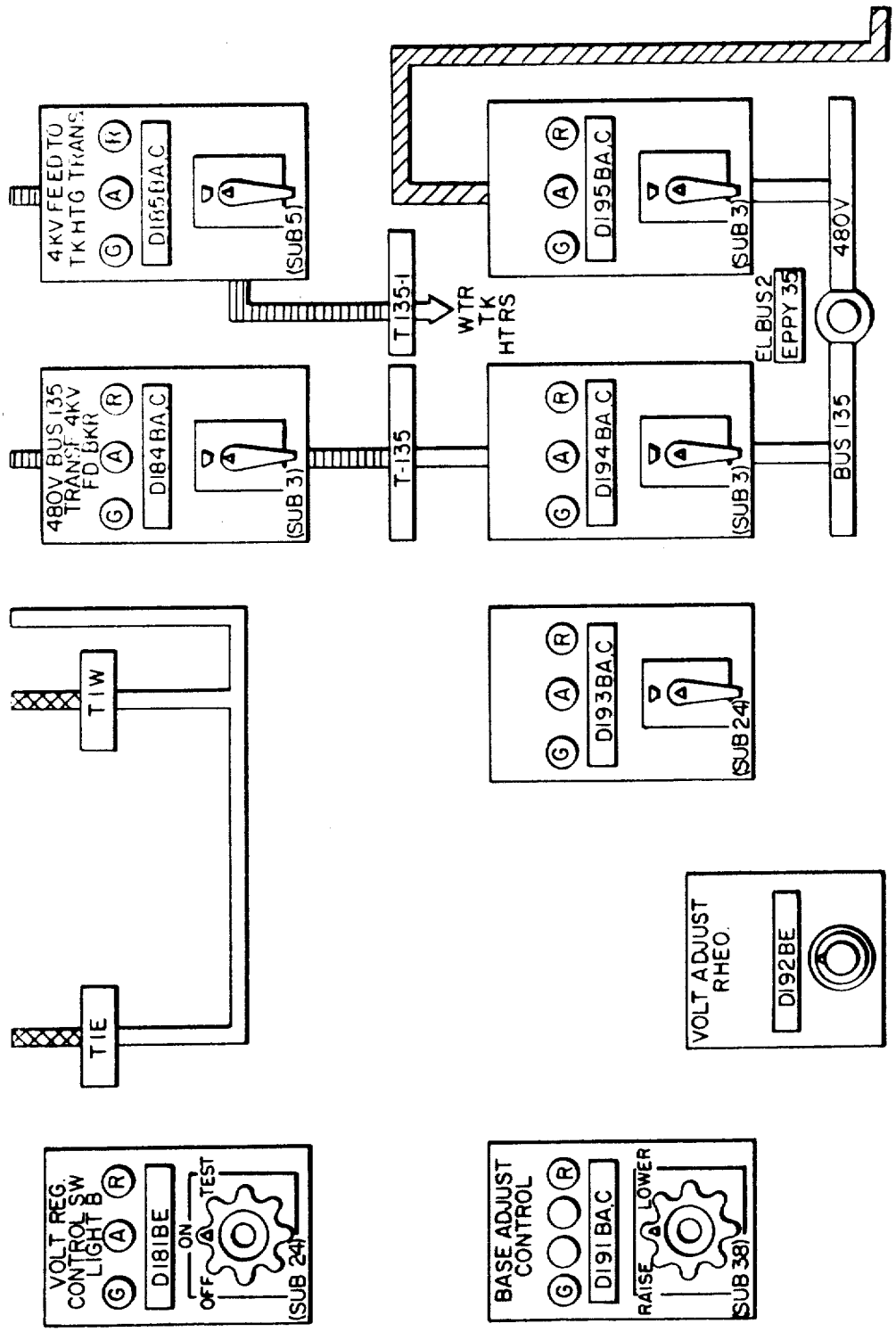
Figure 93:
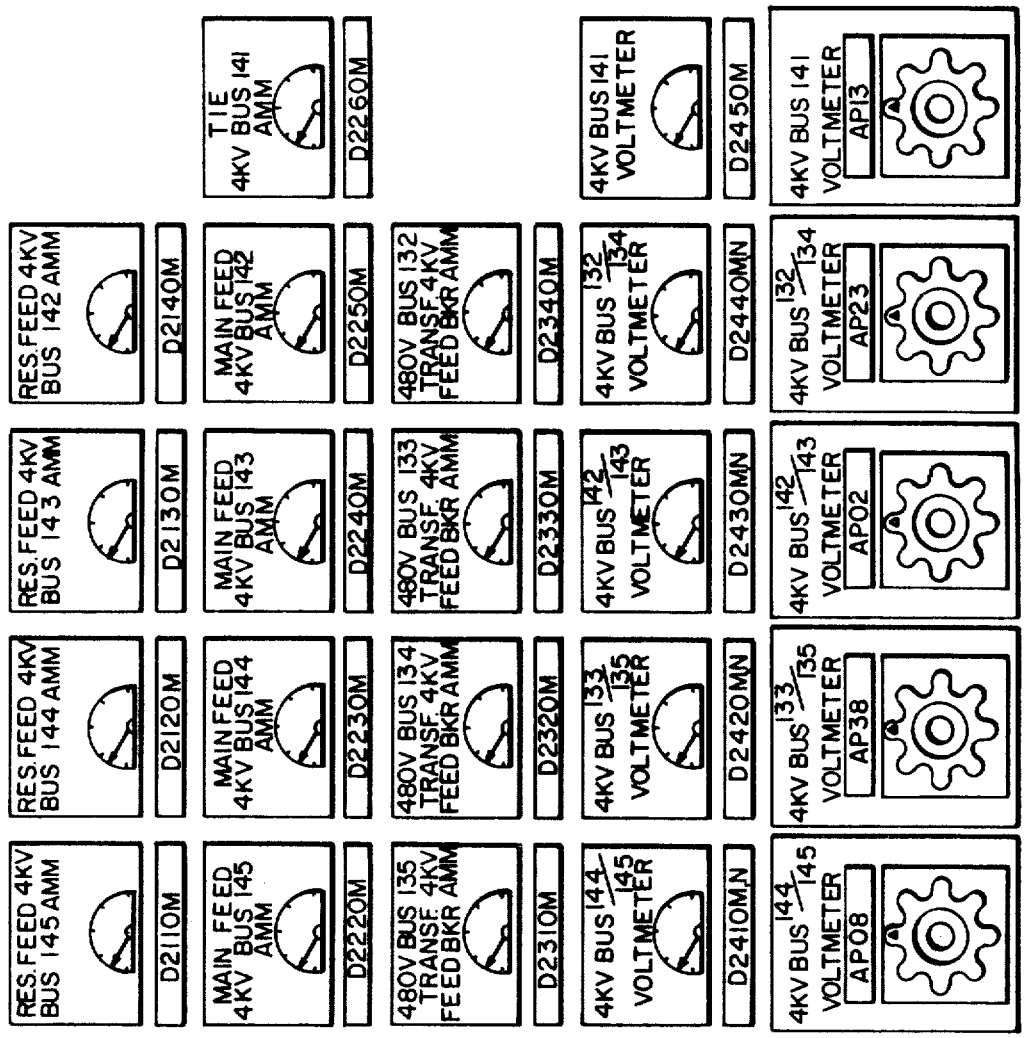
Figure 93W:
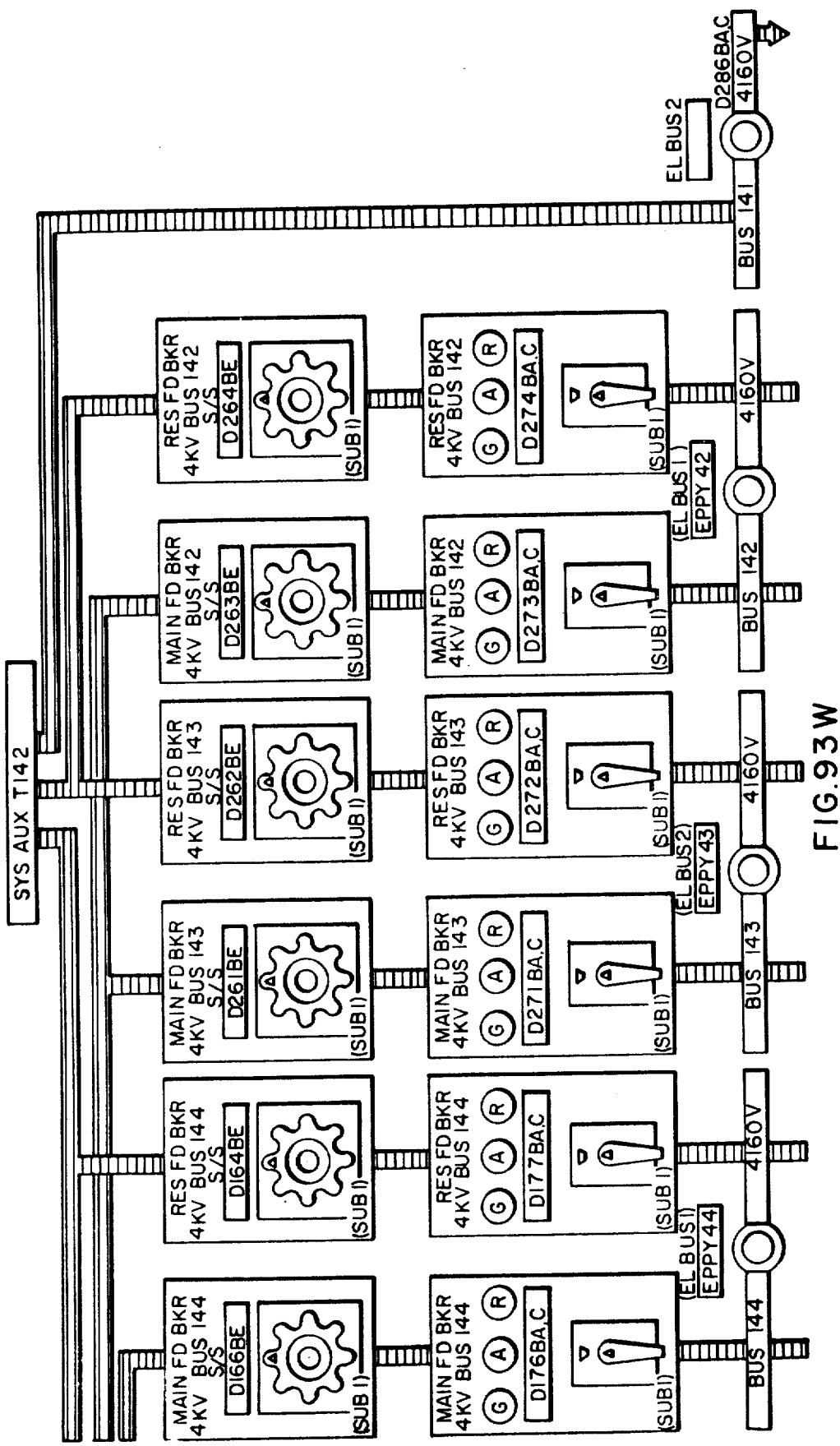
Figure 93X:
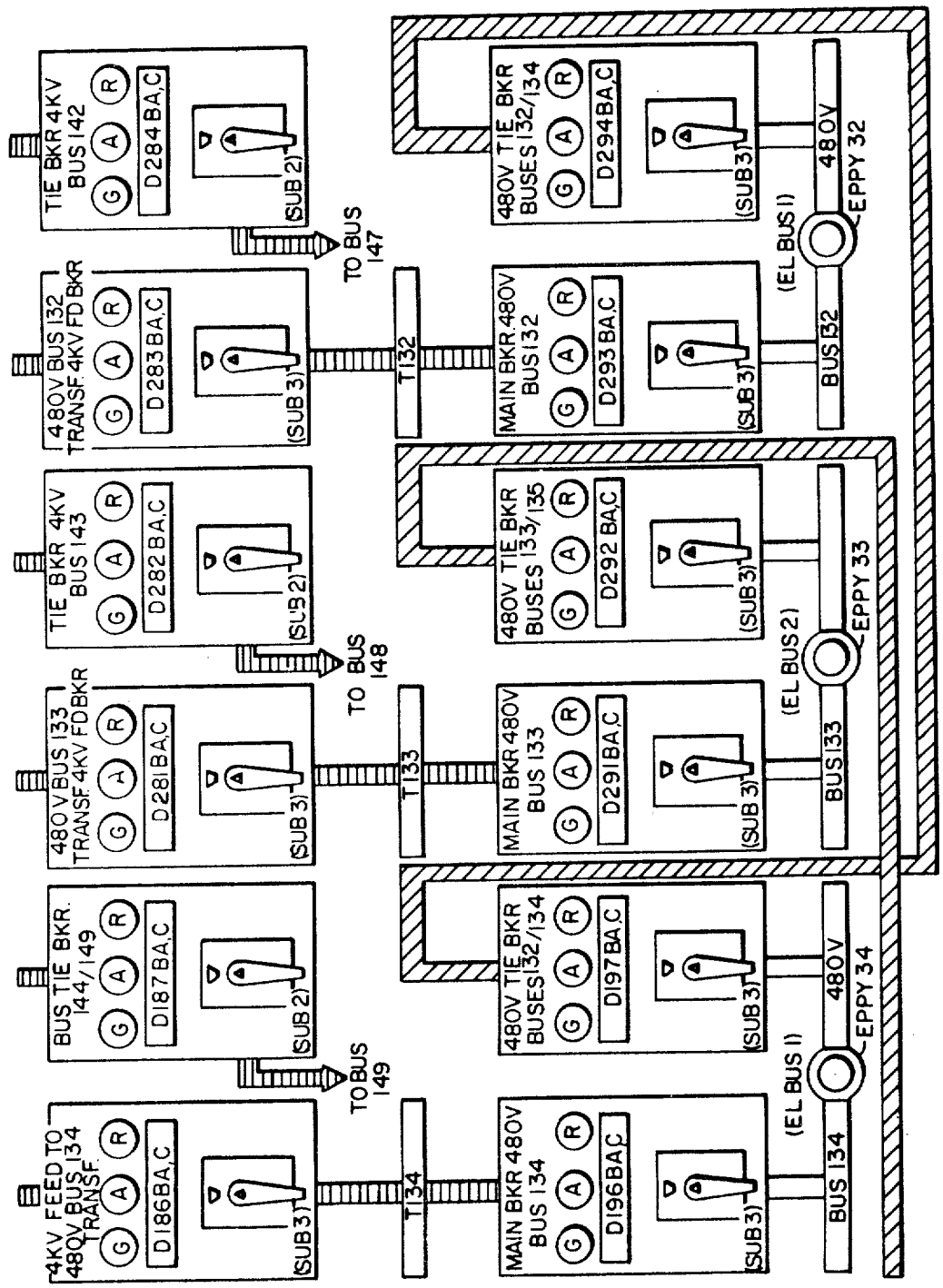
Figure 93Y:
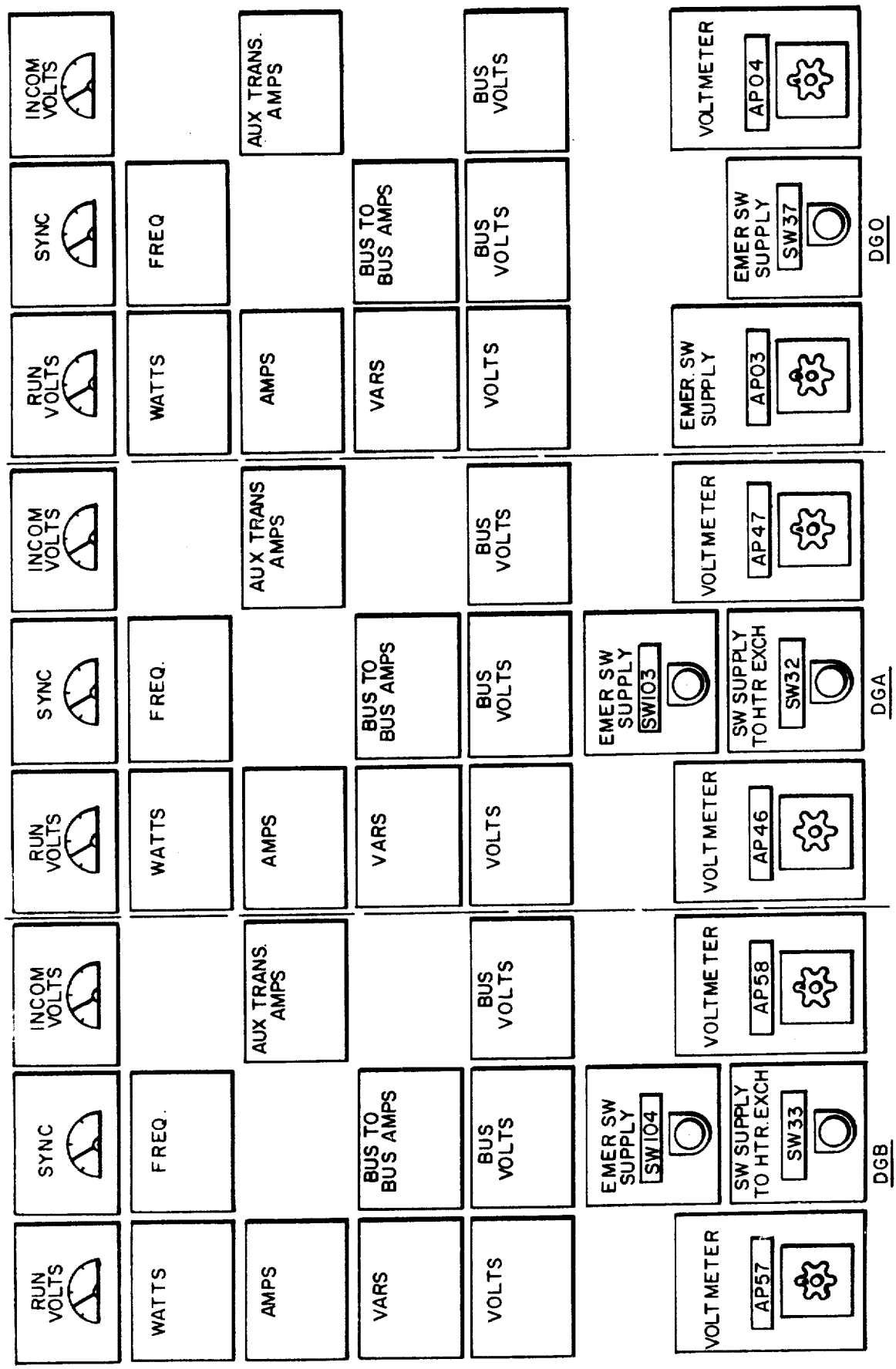
Figure 93Z:
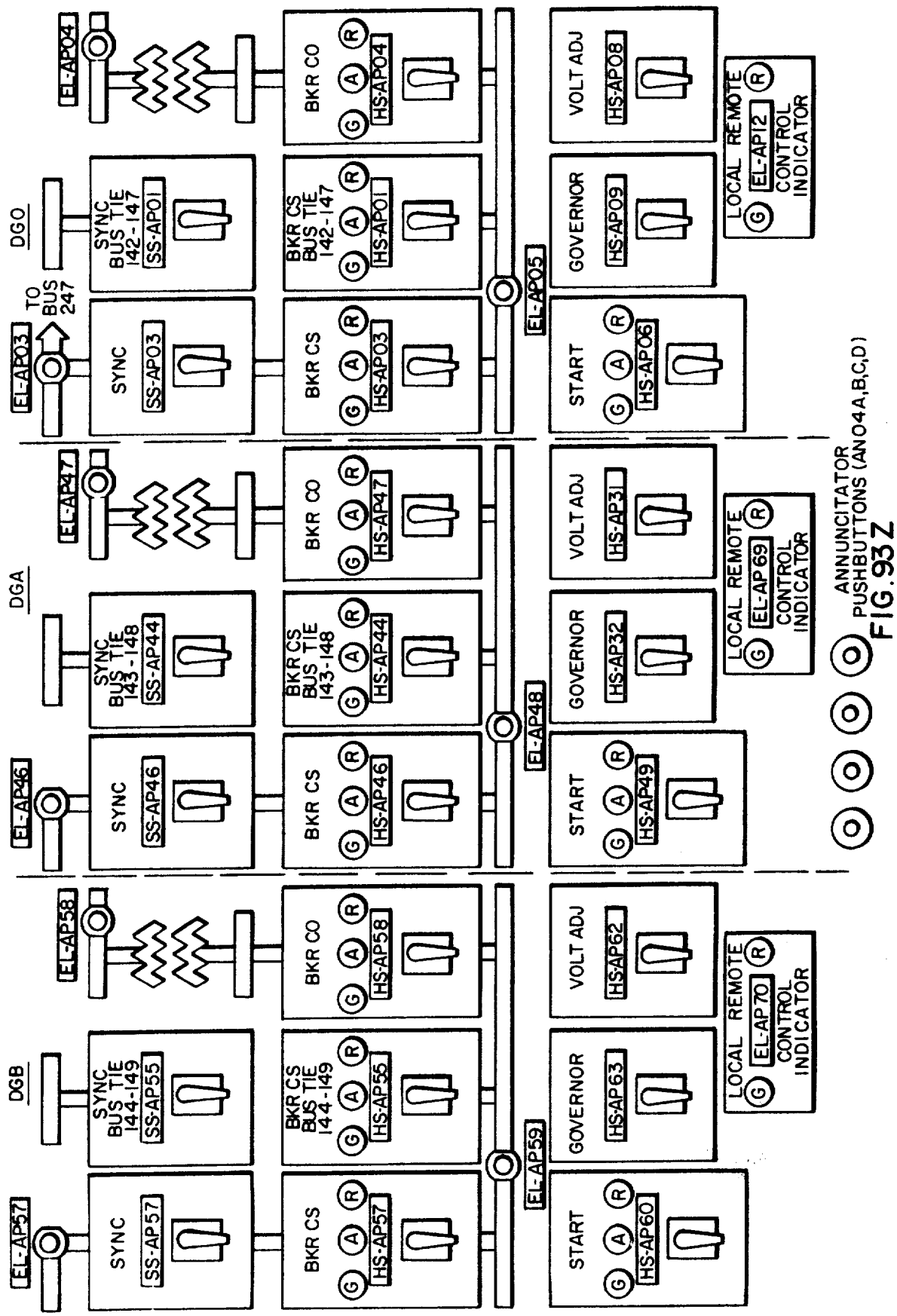

Referring to FIGS. 93Y and 93Z, the main control board includes controls for remotely controlling the governor, voltage regulator, synchronizing, and the generator breaker for each of the three diesel generators simulated in accordance with this embodiment of the invention.

The diesel generator system simulation T64 is executed by the subroutine ELCRNT. The input to this system includes the breaker position on the control panels, and the outputs include the diesel generator voltage, power (real and reactive), and current and frequency. In the simulation, three modes of diesel generator operation are distinguished depending on the position of the circuit breakers. The three modes of operation are: not tied to the load, sharing the load with the main network as above mentioned, and tied to the load. A model is implemented for each of the above modes of operation. In the embodiment described, there are three diesel generators which have identical mathematical models.

In the first mode of operation, where a diesel generator is operated alone without being tied to a bus, the current to the bus and the real and reactive power are zero. Output voltage is made a function of the reference voltage, which simulates the action of the voltage controller, the input to which is from the voltage adjust rheostat (See FIG 93Z) on the control board. A controller range for the generator is taken to be plus or minus 10 percent of the nominal voltage (4.16 KV); that is, 3.744 to 4.576 KV. The frequency is made a function of speed. Therefore, a change in the diesel generator governor's feed control changes the frequency for ± 5 percent of 60 Hz.

In the second mode of operation, where the diesel generator is tied to the bus which is also a part of the main network, the Diesel Generator is tied to such bus after synchronization. Thus, it has nominal voltage and nominal frequency at its output. The output power is simulated as a function of the speed of the diesel generator as follows:

$POWER = 10,000. * (V1 - 0.5)$ where $POWER$ is the output power and $V1$ is the per-unit speed control. For the moment when synchronization is achieved, $V1$ 0.5 and the power is zero.

Referring to FIG. 114, the reactive power as well as the current in the tie bus is calculated in accordance with such circuit. $x_e$ represents the equivalent reactance between main network voltage $V_N$, and $x_i$ represents the generator internal reactance. Thus, in accordance with such Figure:

$VREFF = VSET - x_i * I_{BUS}$
$I_{BUS} = [(VREFF - V_N)/x_e]$ which yields:

$I_{BUS} = (VSET - V_N)/x_e(1+[x_i/x_e])$

In the above equation the denominator is estimated to be 20 percent; and circulating reactive power CVAR is defined as follows: $CVAR = [(VREFF - V_N)/V_N]$ (* $P_{NOM}/0.85*0.2)$ where, $P_{NOM}$ is nominal power, 0.85 is the power factor, and 0.2 is the per-unit reactance.

With $V_N$ being 4,160 and $P_{NOM}$ being 5,000, the constant terms grouped together yield:

$(P_{NOM}/V_N * 0.85 * 0.2) = 7$ Thus, in the program $EXCRNT, CVAR = (VREFF - 4160.)*7$.

The reactive power of the load is calculated as follows:

$XLWATT = (I_{TRF} + I_{LOAD})* 3 * V_N * 0.85$ where $I_{TRF}$ is the current to the 480V bus, and $I_{LOAD}$ is the current of the load tied directly to the bus. The constant terms are precalculated, which yields the following equation:

$\sqrt{3} * 4,160. * 0.85 \times 10^{-3} = 6.12453$

The total reactive power is represented as follows:

$P_{VAR} = CVAR + \sqrt{1 - 0.85^2})/0.85) * XLWATT$ where the constant term is precalculated yields the following:

$\sqrt{(1 - 0.85^2)}/0.85) = 0.62235$ and $P_{VAR}$ is the total reactive power. The tie watts are defined as $TWATT = XLWATT - POWER$, which yields field current to the bus in accordance with the following equation:

$I_{FEED} = \sqrt{[(POWER)^2 + (P_{VAR})^2]/(4,160 * 3)}$

In the last-mentioned equation the constant term is precalculated, which together with the scale factor yields $3 * 4,160. * 10^{-3} = 7.20533$. The tie current, which is normally calculated from the current distribution is calculated in this simulation as follows:

$I_{TIE} = \sqrt{[(TWATT)^2 + (CVAR)^2]}/(4,160. * \sqrt{3})$

The third mode of operation, where the diesel generator is connected to the auxiliary system load, occurs after the generator is synchronized and after it has picked up its load; that is, when the tie current is compensated to zero; and then the tie breaker is disconnected. The feed current to the bus is a function of the voltage as follows:

$I_{FEED} = (I_{TRF} + I_{LOAD}) * (VREF/4,160)$

The output voltage is equal to the reference voltage $VREF$, and the voltage in the 480V bus is a function of the Diesel output voltage in accordance with the following equation:

$V_{480}$ bus $= 0.115384 * VREF$, where 0.115384 is the transformation ratio.

Now, the diesel generator output power POWER is calculated as follows:

$POWER = I_{FEED} * VREF * 0.85 * \sqrt{3}$

Thus, in the final implementation:

$3 * 0.85 * 10^{-3} = 1.47224 * 10^{-3}$

The diesel generator output reactive power is determined in accordance with the following equation:

$P_{VAR} = \sqrt{[1 - 0.85^2/0.85\,]} * POWER$

The generator frequency is made the function of speed and power, as follows:

$FREQ = 57 + 6 * [V1 - (POWER/10,000]$

If the speed of the diesel generator is not set so that its frequency is 60 Hertz, generator drifting is simulated by ramping the frequency in the appropriate direction. In this case of reverse power, a logical variable is set and used further in the protection logic in the A machine. The protection for each diesel generator is as follows:

$EPZURA = POWER\ .LE.\ -50.$

It is understood that the various inventive features in the improved method and simulation system, may be implemented in either an analog, digital or analog/digital with or without single or multiple computer apparatus. Also many of the features are applicable in the simulation of other pressurized water reactor plant arrangements, boiling water reactor plants, and gas and other nuclear plant arrangements. Also some features are applicable to fossil-fired power plants. It is further understood, that with respect to the individual models, that the changing of one or more models in the simulator does not affect the system, method, or operation of other models in the simulator.

Reference is made to U.S. patent application bearing Ser. No. 333,901 entitled "Training Simulator For a Nuclear Power Plant" and filed by G. L. Gregg, R. E. Putman and J. W. Gomola which is assigned to the present assignee and filed concurrently herewith; and which is incorporated herein by reference and made a part hereof.

We claim:

1. A system for the dynamic simulation of the real-time operation of a nuclear power plant, comprising a plurality of manually operable devices for remotely operating simulated plant devices, including varying a simulated alternating current voltage output frequency, a plurality of indicating devices for monitoring the operation of the simulated plant including synchroscope indicating means for comparing the frequency and phase of an alternating voltage on isolated electrical conductors, first means to generate physical values relating to the voltage frequency output of a first simulated electrical generating source in accordance with values relating to the operation of predetermined manually operable devices, second means to generate physical values relating to the voltage frequency output of a second electrical generating source, third means to generate a third physical value in accordance with the difference between the first and second physical values, means responsive to the third physical value to generate an analog signal representative of the third physical value, means to generate an alternating current voltage having a frequency representative of the value of the analog signal, means to apply a reference alternating voltage to the synchroscope indicating means, and means responsive to the generated frequency and the reference frequency to operate the synchroscope indicating means in accordance with the third physical value to monitor the difference frequency between the isolated electrical conductors in accordance with the speed of rotation of the synchroscope indicating means.

2. A system according to claim 1 wherein the generated third physical value includes a normalizing factor, the value of which is related to the value of the reference voltage.

3. A system according to claim 1 wherein the angular position of the synchroscope indicating means is representative of the phase difference between the isolated conductors, further comprising means responsive to the closing of a simulated circuit breaker to connect the simulated isolated conductors to substitute the reference voltage for the generated voltage, whereby the synchroscope indicating means indicates an in phase relationship.

4. A system according to claim 1 wherein the analog signal generating means includes a plurality of input channel gates each of which relates to a possible condition of operation of a simulated electrical generating means and the operated condition of the manually operable means, further comprising, means responsive to the position of the manually operable devices and the simulated operation of simulated electrical generating means to operate a single one of the gates in accordance with a determination of a predetermined running voltage bus and the presence or absence of a voltage on the predetermined bus and the incoming line, and the closed circuit condition between the running bus and the incoming voltage.

5. A training simulator for the dynamic operation of a nuclear power electrical generating plant comprising,
a control and monitoring console having a plurality of remote control and indicating devices for remotely controlling and monitoring simulated devices of the plant,
a first means including a programmed digital computer connected to the control and monitoring console responsive to input data relating to the operation of the remote control devices to calculate physical values relating to the alternating current voltage output of a plurality of electrical generating means, a second means including a programmed digital computer to calculate a data value relating to a frequency difference between any two of the voltage outputs in accordance with each of the calculated output voltages, circuit means to generate an alternating current voltage having a frequency related to a selected one of the frequency difference related values, a third means including a programmed digital computer to select one of the frequency difference related data values for input to the circuit means, indicating means responsive to the generated alternating current voltage to monitor the frequency difference between the selected voltage outputs, and means responsive to the manually operable devices to vary the operation of at least one of the electrical generating means.

6. A system according to claim 5 wherein the second means includes a normalizing factor to the frequency related difference value and the indicating means is operative in accordance with the generated voltage frequency and the frequency of a reference voltage.

7. A system according to claim 6 including means responsive to the closing of a simulated circuit breaker connecting the selected frequency difference related data to change the frequency and phase of the generated output voltage to correspond to the frequency and phase of the reference voltage.

8. A system according to claim 5 wherein the third means includes a first selection means to determine the simulated bus having a running voltage, a second selection means to determine the presence and source of voltage on the running bus, a third selection means to determine the presence of a voltage on an incoming line, and a fourth selection means to determine an open circuit condition between the running bus and incoming voltage.

9. A system according to claim 5 wherein the plurality of electrical generating sources includes a simulated main generator incoming voltage and an external running voltage.

10. A system according to claim 5 wherein the plurality of electrical generating sources includes a simulated main generator voltage and a simulated diesel generator voltage.

11. A method of simulating the dynamic operation of a nuclear power plant that has a plurality of alternating voltage sources including a main generator that is connectable to an electrical distribution line on which there is an AC voltage of a predetermined frequency and at least one auxiliary generator connectable to an electrical distribution line with the main generator, utilizing apparatus wherein a plurality of console control devices corresponding to simulated plant control devices provide input data to means including a programmed digital computer to generate physical values relating to plant operation and a plurality of indicating devices including a synchroscope to respond to generated output data to monitor the simulated operation of the plant, comprising, generating during each time step data values relating to the frequency output of the voltage sources in accordance with input data from the console control devices, generating during each time step a data value relating to the difference frequency of any two of the plurality of simulated voltage sources in accordance with generated data values relating to frequency output voltage, selecting one of the frequency difference data values in accordance with the operation of the manually operable devices, converting the selected frequency difference data value to an alternating current voltage, and detecting the frequency between each of the selected voltage sources.

12. A method according to claim 11 wherein the selection of the frequency difference data value comprises determining each simulated electrical conductor on which there is an AC voltage in accordance with the operation of predetermined console control devices, determining the presence or absence of a voltage on each running bus in accordance with the operation of predetermined console control devices and the simulated operation of the electrical generating sources, determining the presence or absence of a voltage on each incoming line in accordance with the operation of predetermined console control devices, and determining the closed circuit condition between each running bus and incoming voltage in accordance with simulated control devices.

13. A method according to claim 11 wherein the difference frequency data value includes a normalizing factor to operate the circuit means to apply an AC voltage to the synchroscope indicating means to operate such indicating means in accordance with the difference between the generated AC voltage and a reference voltage applied to the synchroscope indicating means.

14. A method according to claim 13 further comprising connecting a voltage equal in phase and frequency to the synchroscope indicating means in response to the operation of a simulated control device connecting the simulated voltage sources.

* * * * *